United States Patent
Williams et al.

(10) Patent No.: US 9,233,428 B2
(45) Date of Patent: Jan. 12, 2016

(54) COMPUTER CONTROLLED MULTIPLE AXIS GRINDING MACHINE FOR GRINDING SAW BLADES

(71) Applicant: WILLIAMS AND WHITE MACHINE INC., Burnaby (CA)

(72) Inventors: Justin Williams, Vancouver (CA); Matt Williams, Burnaby (CA); Brodie Shute, Vancouver (CA); Evan Hohert, Vancouver (CA); Steve Stuber, Surrey (CA); Saqib Naveed, Surrey (CA); Alex Makhnev, Burnaby (CA)

(73) Assignee: Williams & White Machine Inc., Burnaby, British Columbia (CA)

( * ) Notice: Subject to any disclaimer, the term of this patent is extended or adjusted under 35 U.S.C. 154(b) by 47 days.

(21) Appl. No.: 14/367,960

(22) PCT Filed: Dec. 21, 2012

(86) PCT No.: PCT/CA2012/050932
§ 371 (c)(1),
(2) Date: Jun. 23, 2014

(87) PCT Pub. No.: WO2013/091110
PCT Pub. Date: Jun. 27, 2013

(65) Prior Publication Data
US 2014/0370785 A1 Dec. 18, 2014

Related U.S. Application Data

(60) Provisional application No. 61/580,065, filed on Dec. 23, 2011, provisional application No. 61/600,382, filed on Feb. 17, 2012.

(51) Int. Cl.
*B24B 3/36* (2006.01)
*B23D 63/12* (2006.01)
(Continued)

(52) U.S. Cl.
CPC .............. *B23D 63/12* (2013.01); *B23D 63/123* (2013.01); *B23D 63/14* (2013.01); *B24B 3/36* (2013.01); *B24B 3/46* (2013.01); *B24B 27/0076* (2013.01); *B24B 51/00* (2013.01)

(58) Field of Classification Search
CPC ........ B24B 3/36; B24B 3/46; B24B 27/0076; B24B 51/00; B23D 63/12; B23D 63/123; B23D 63/14
USPC ......... 451/9, 10, 11, 182, 184, 185, 224, 229, 451/234, 192, 196, 198, 248, 5; 76/48, 43
See application file for complete search history.

(56) References Cited

U.S. PATENT DOCUMENTS 1,762,854 A * 6/1930 Cooper .................. B23D 63/12
451/363
4,133,240 A 1/1979 Vollmer et al.
(Continued)

FOREIGN PATENT DOCUMENTS

CA 578715 A 6/1959
CA 598719 A 5/1960
(Continued)

OTHER PUBLICATIONS

International Search Report and Written Opinion for PCT/CA2012/050932 mailed Mar. 8, 2013.
(Continued)

*Primary Examiner* — George Nguyen
(74) *Attorney, Agent, or Firm* — Troutman Sanders LLP; Ryan A. Schneider; Christopher C. Close, Jr.

(57) ABSTRACT

A saw grinding apparatus comprises a saw blade mount for mounting a saw blade thereto; a tool rack comprising multiple tool bays each for storing a grinding tool; and at least one computer numerically controlled (CNC) multiple axes grind wheel manipulator which uses each grinding tool to perform a saw grinding operation. The manipulator includes a spindle connectable to a grinding tool and is movable to a grinding position wherein a grinding operation can be performed on a saw blade mounted to the saw blade mount. The manipulator is also movable to a tool change position wherein the spindle can engage a grinding tool stored in a tool bay and can deposit a grinding tool in an empty tool bay.

19 Claims, 24 Drawing Sheets

(51) Int. Cl.
*B24B 27/00* (2006.01)
*B24B 3/46* (2006.01)
*B23D 63/14* (2006.01)
*B24B 51/00* (2006.01)

(56) References Cited

U.S. PATENT DOCUMENTS

| | | | |
|---|---|---|---|
| 4,173,914 A | 11/1979 | Vollmer et al. | |
| 5,319,885 A | 6/1994 | Beck et al. | |
| 5,326,954 A | 7/1994 | Lenard et al. | |
| 5,471,897 A | 12/1995 | Wright | |
| 5,592,985 A | 1/1997 | Hensinger et al. | |
| 5,868,602 A * | 2/1999 | Pallman | B24B 3/363 451/10 |
| 5,890,401 A | 4/1999 | Hensinger et al. | |
| 5,908,989 A | 6/1999 | Beck et al. | |
| 5,931,057 A | 8/1999 | Beck et al. | |
| 5,941,138 A | 8/1999 | Beck et al. | |
| 5,945,009 A | 8/1999 | Beck et al. | |
| 6,109,137 A | 8/2000 | Lenard et al. | |
| 6,224,462 B1 * | 5/2001 | Yokoyama | B24B 5/00 451/10 |
| 6,264,531 B1 | 7/2001 | Bailer et al. | |
| 6,279,424 B1 | 8/2001 | Bailer et al. | |
| 6,329,624 B1 | 12/2001 | Lenard et al. | |
| 6,332,375 B1 * | 12/2001 | Randl | B23D 63/12 76/37 |
| 6,379,218 B1 * | 4/2002 | Bailer | B23D 63/00 451/56 |
| 6,523,438 B1 | 2/2003 | Gerling | |
| 6,681,655 B2 | 1/2004 | Rein | |
| 7,008,298 B2 | 3/2006 | Riehlein et al. | |
| 7,033,254 B2 | 4/2006 | Lenard et al. | |
| 7,104,870 B2 * | 9/2006 | Fong | B23F 19/002 451/10 |
| 7,140,948 B2 | 11/2006 | Lenard et al. | |
| 7,165,483 B2 | 1/2007 | Bailer et al. | |
| 7,207,865 B2 | 4/2007 | Bailer et al. | |
| 7,261,024 B2 | 8/2007 | Bailer et al. | |
| 7,837,533 B2 | 11/2010 | Brand et al. | |
| 7,988,531 B2 * | 8/2011 | Braun | B23Q 3/15706 451/10 |
| 2002/0035893 A1 * | 3/2002 | Schurb | B23D 63/001 76/40 |
| 2004/0185760 A1 * | 9/2004 | Weatherly | B24B 3/583 451/340 |
| 2005/0130563 A1 * | 6/2005 | Riehlein | B23D 63/12 451/11 |
| 2006/0057941 A1 * | 3/2006 | Lenard | B23D 63/12 451/11 |
| 2009/0203296 A1 | 8/2009 | Braig et al. | |

FOREIGN PATENT DOCUMENTS

| | | | |
|---|---|---|---|
| CA | 2220148 C | 11/1996 | |
| DE | 19518710 C1 * | 11/1996 | B23D 63/12 |
| DE | 29622683 | 4/1997 | |
| DE | 19638287 A1 | 4/1998 | |
| DE | 29908934 | 11/1999 | |
| DE | 20022408 | 8/2001 | |
| DE | 20022521 | 10/2001 | |
| DE | 20180006 | 1/2002 | |
| DE | 10040493 A1 | 3/2002 | |
| EP | 1218117 A1 | 7/2002 | |
| EP | 1274532 A1 | 1/2003 | |
| EP | 1274535 A1 | 1/2003 | |
| WO | 0102130 A1 | 1/2001 | |
| WO | 0176809 A1 | 10/2001 | |
| WO | 0188475 A1 | 11/2001 | |

OTHER PUBLICATIONS

Walter Maschinenbau GmbH, Woodtronic Programme: CNC grinding machines for carbide-tipped circular saw blades, Tubingen, Germany.

Vollmer Werke Maschinenfabrik GmbH, CHD: The complete machining of carbide-tipped circular saw blade tooth geometries in a single setting—to the very highest standard, Biberach an der Riss, Germany.

Vollmer Werke Maschinenfabrik GmbH, CHF 270: The new side grinding machine for saw blade production. With full CNC control., Biberach an der Riss, Germany.

\* cited by examiner

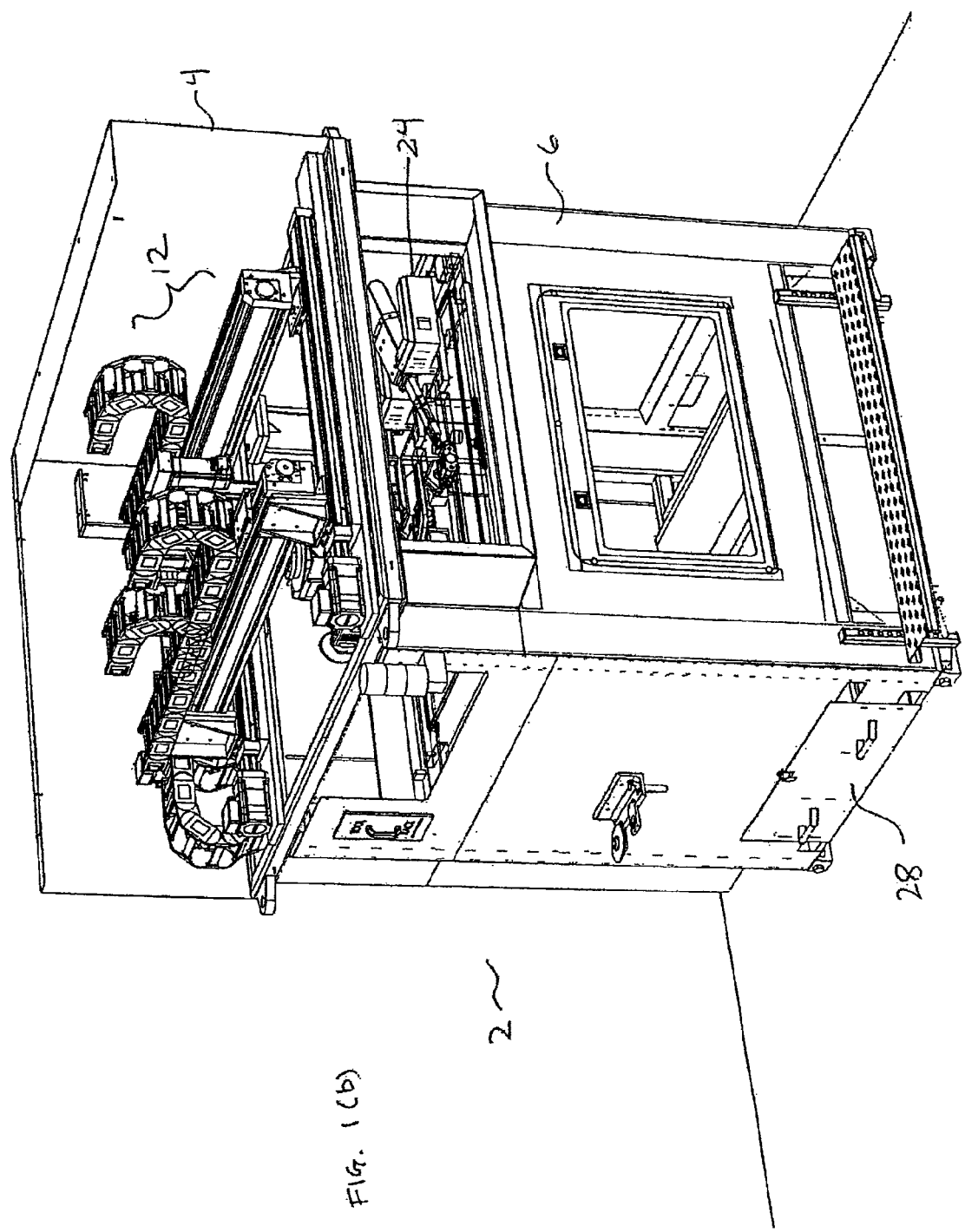

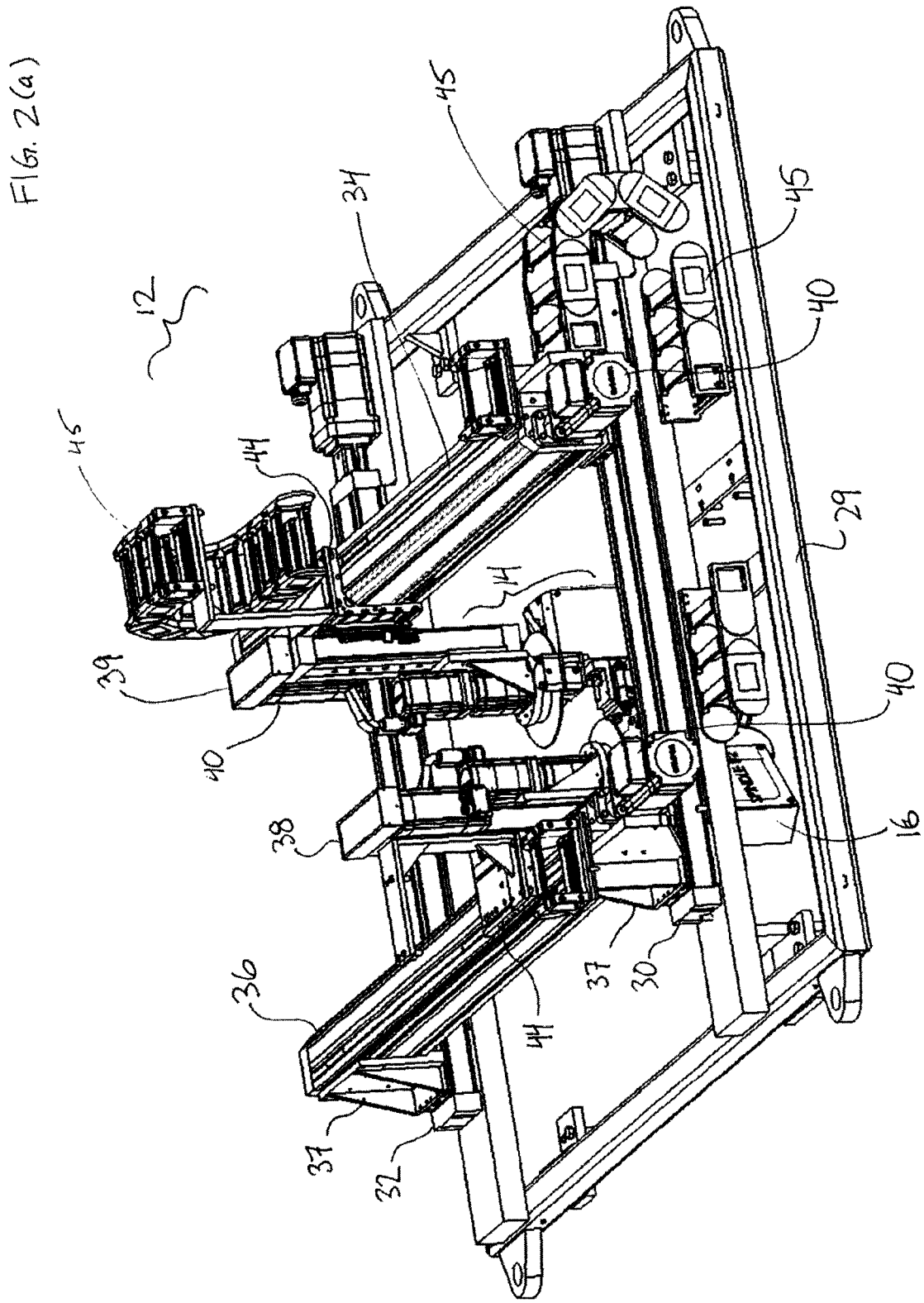

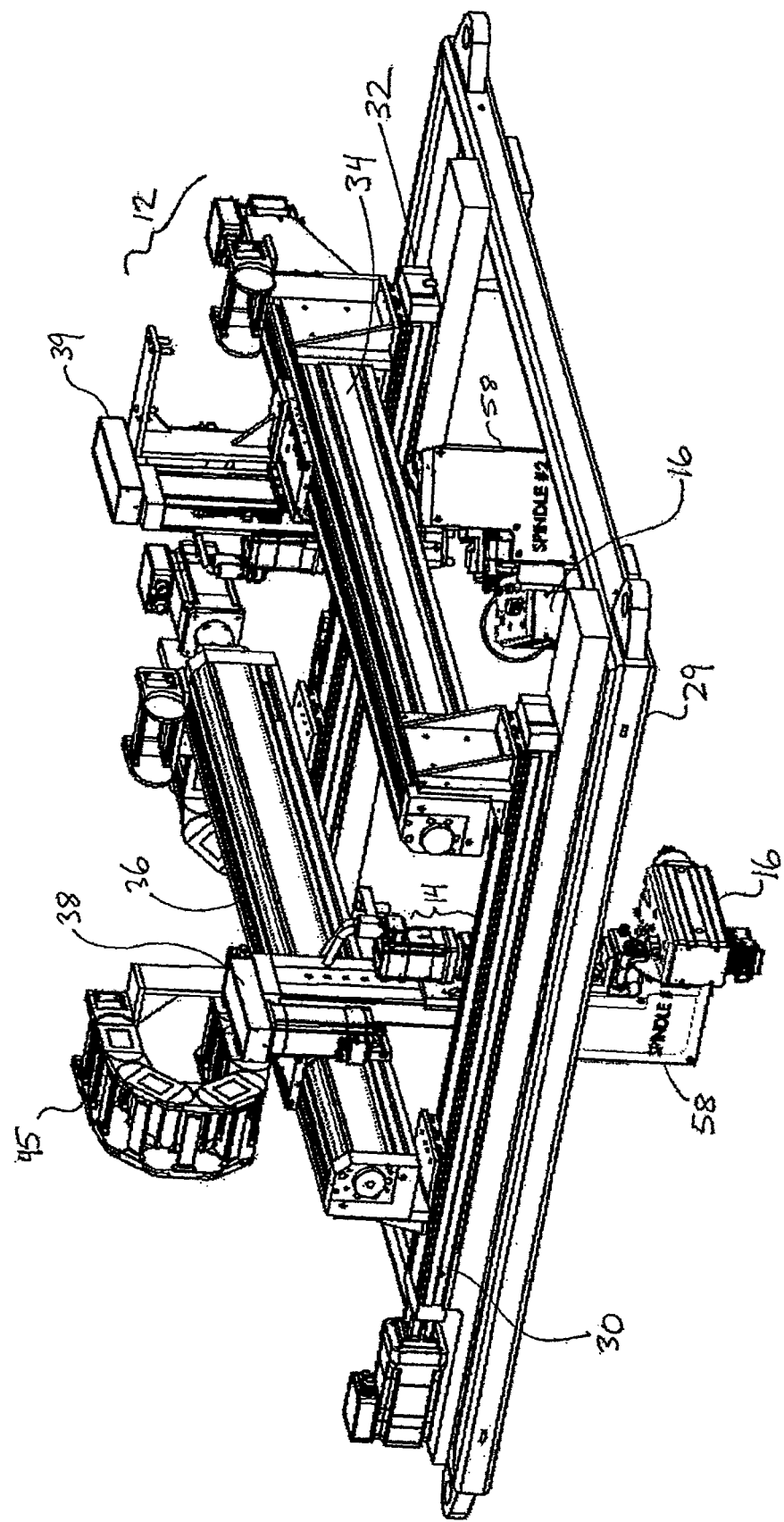

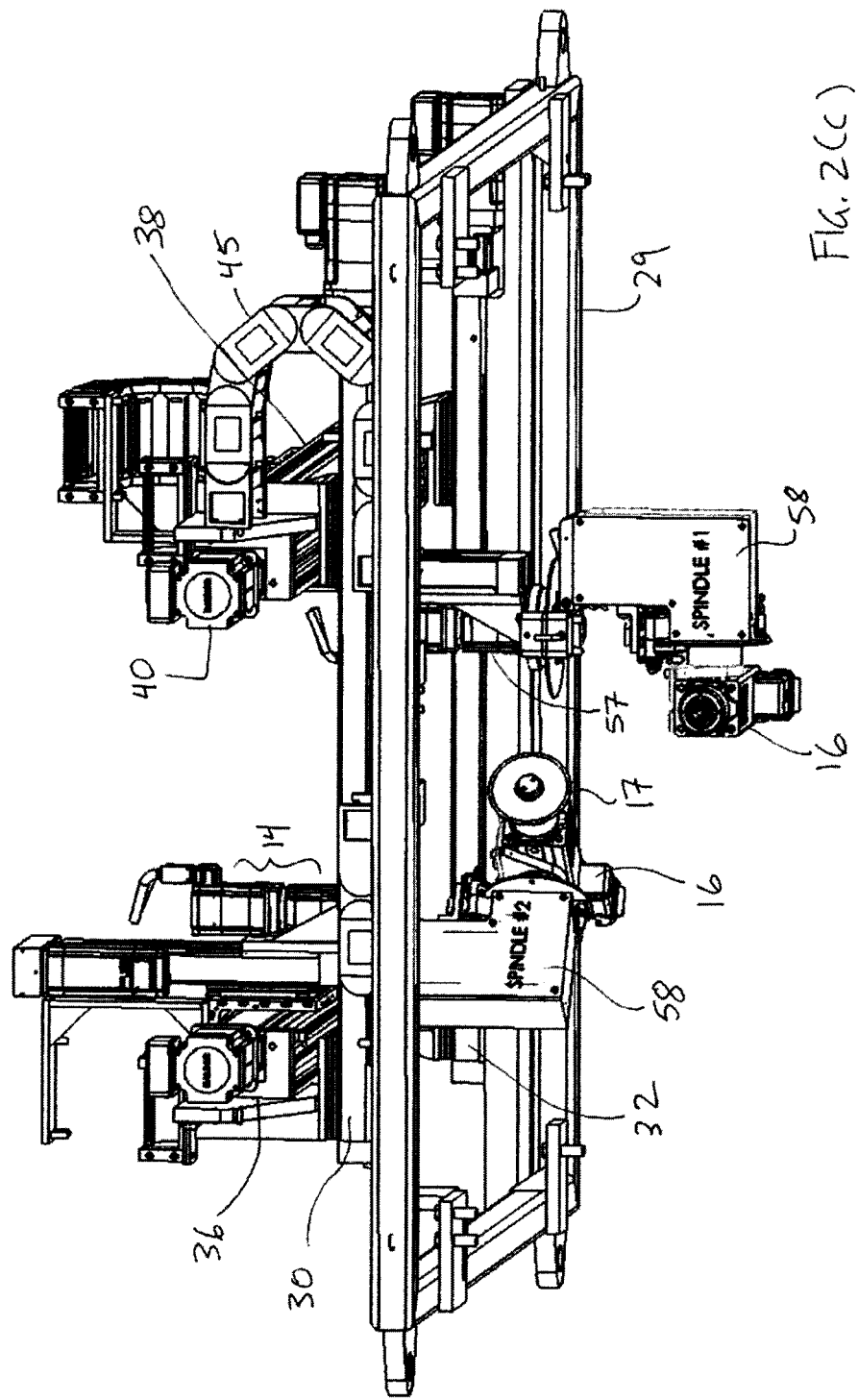

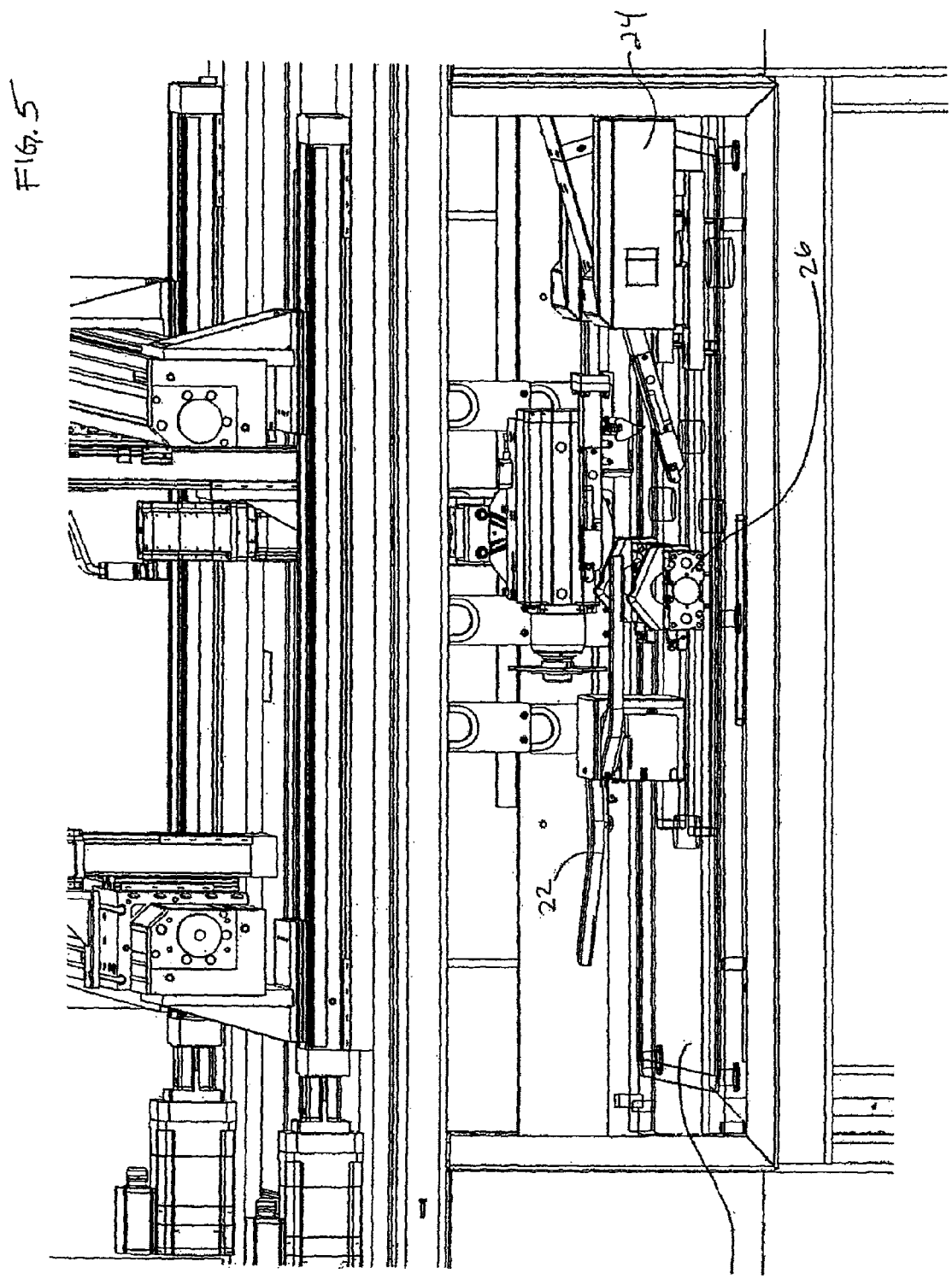

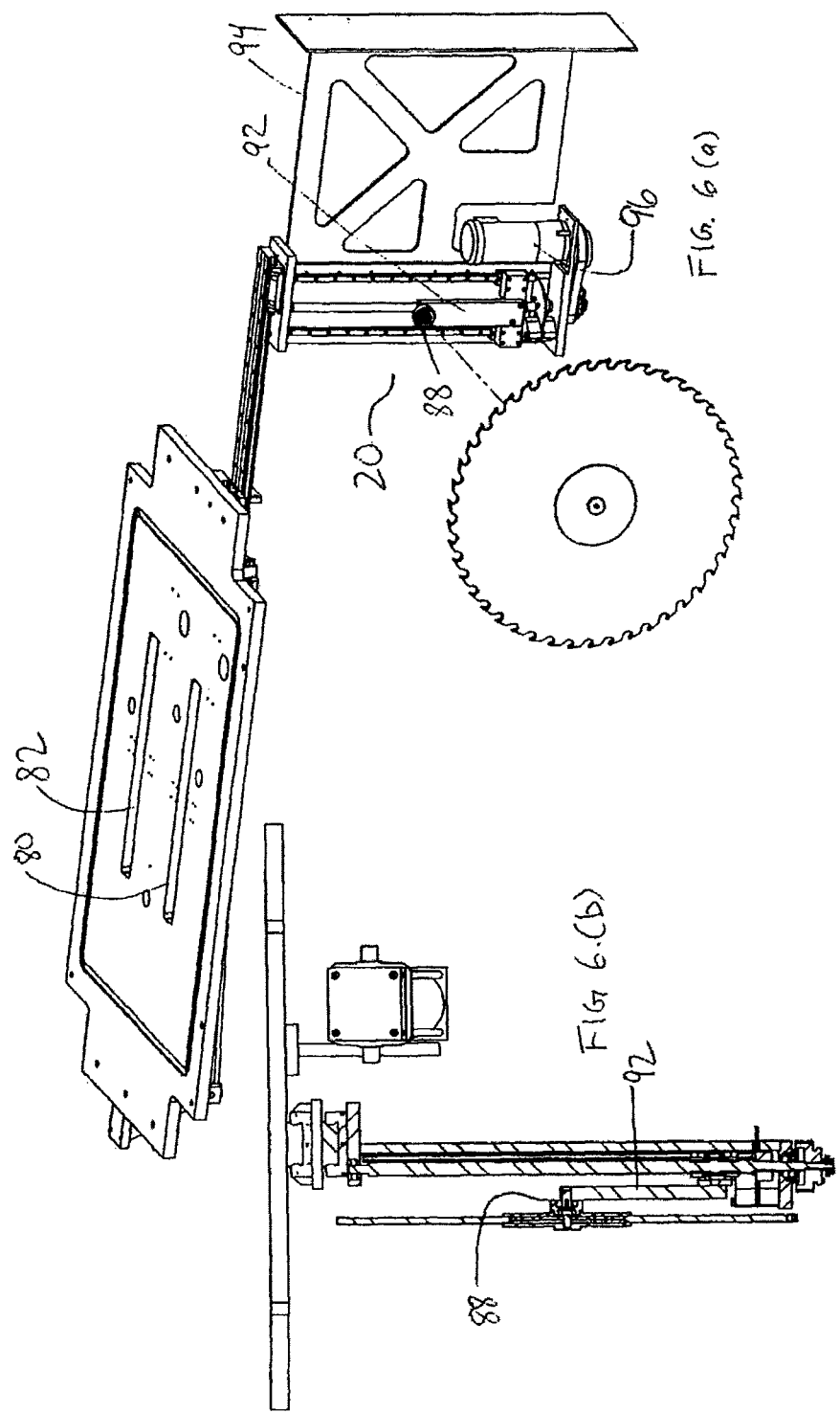

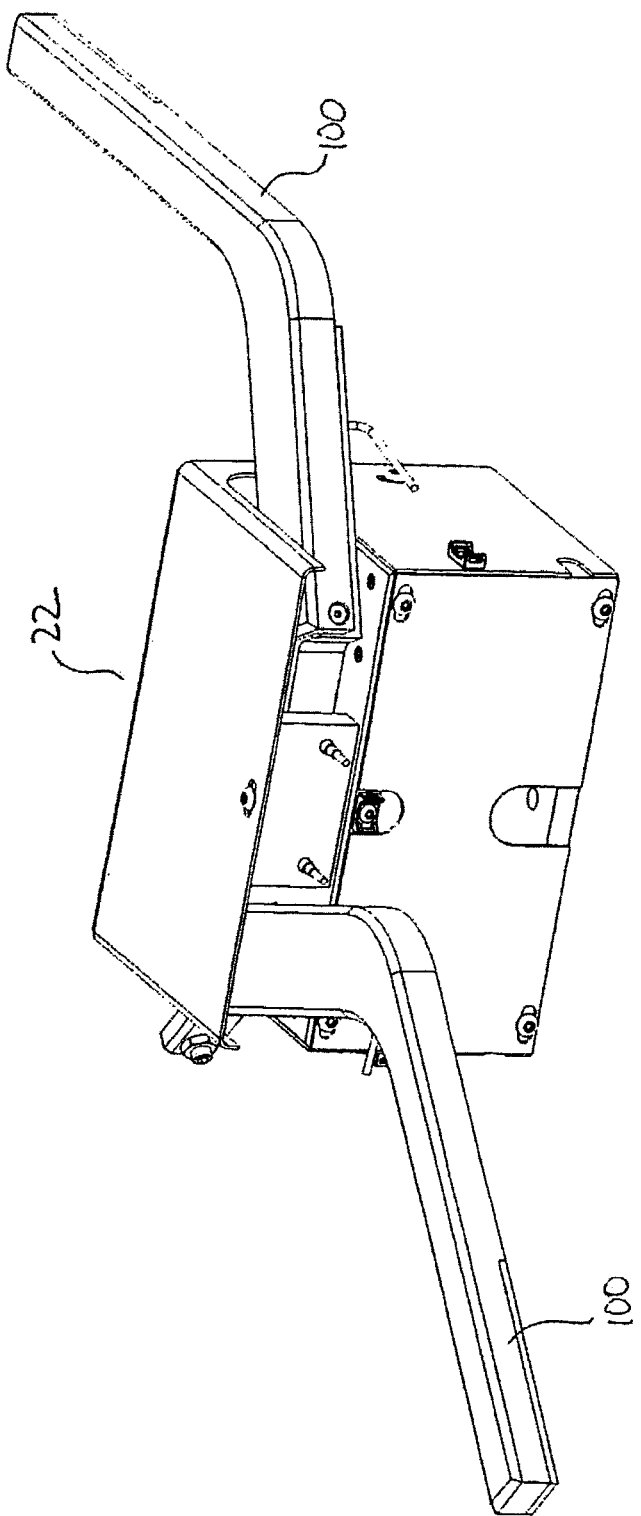

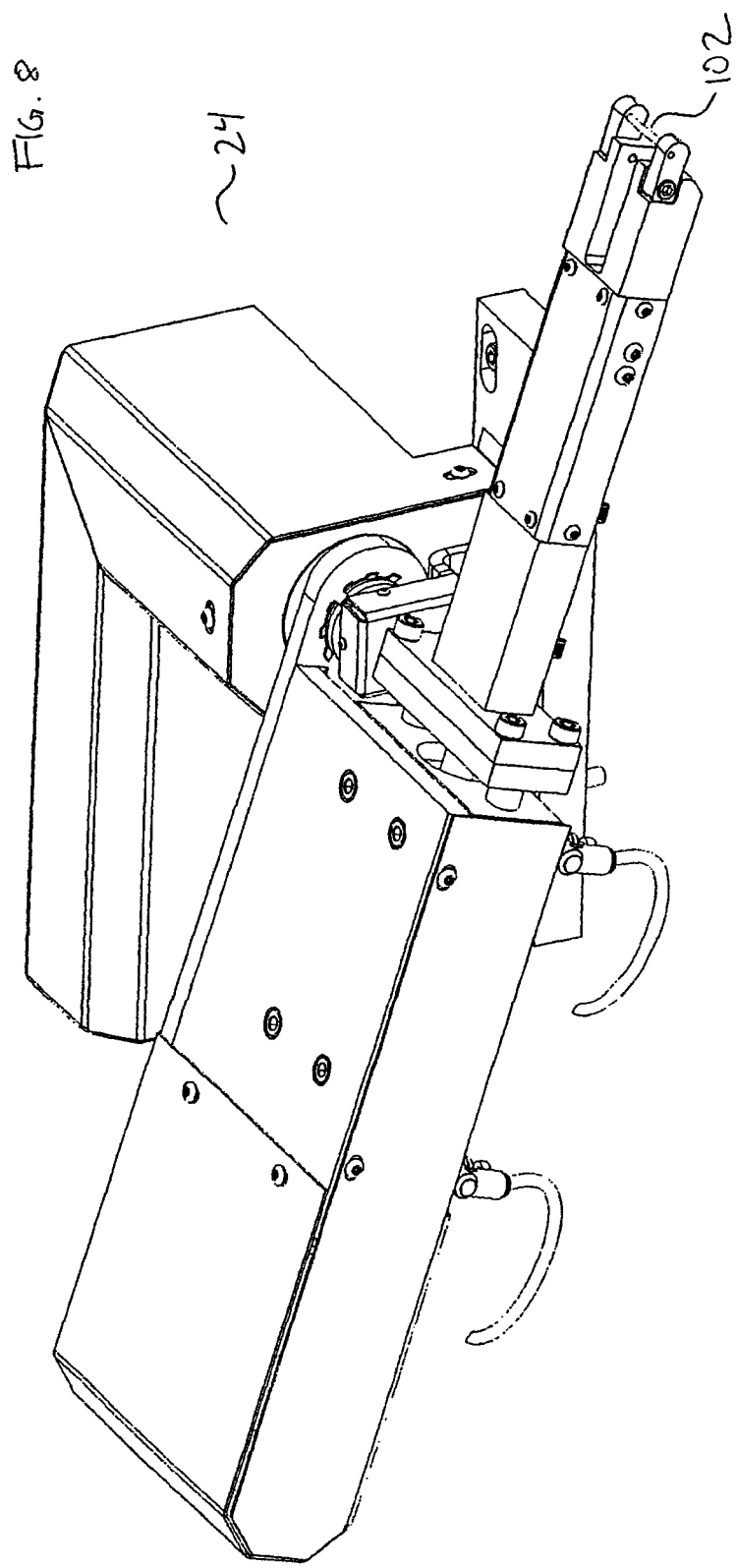

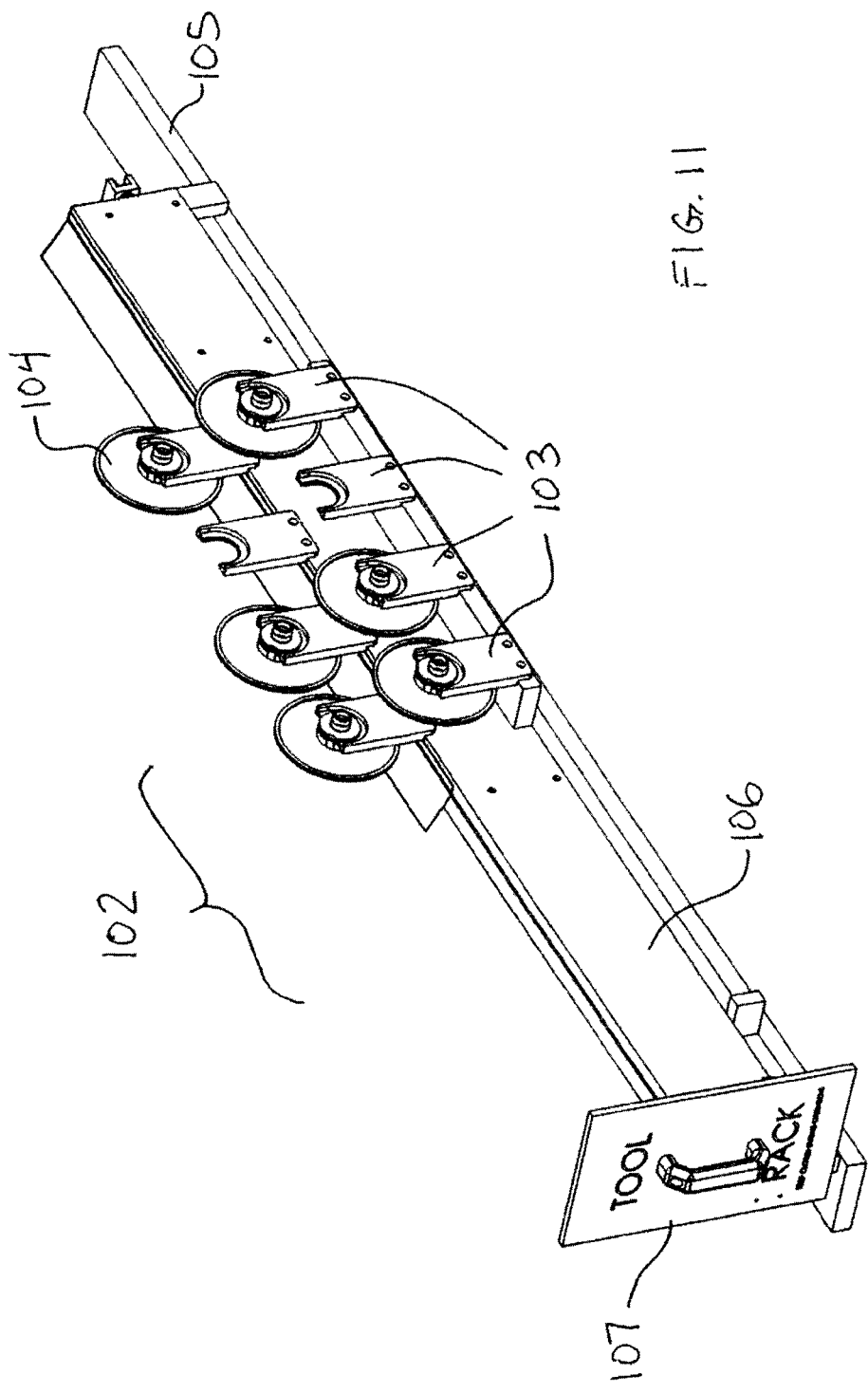

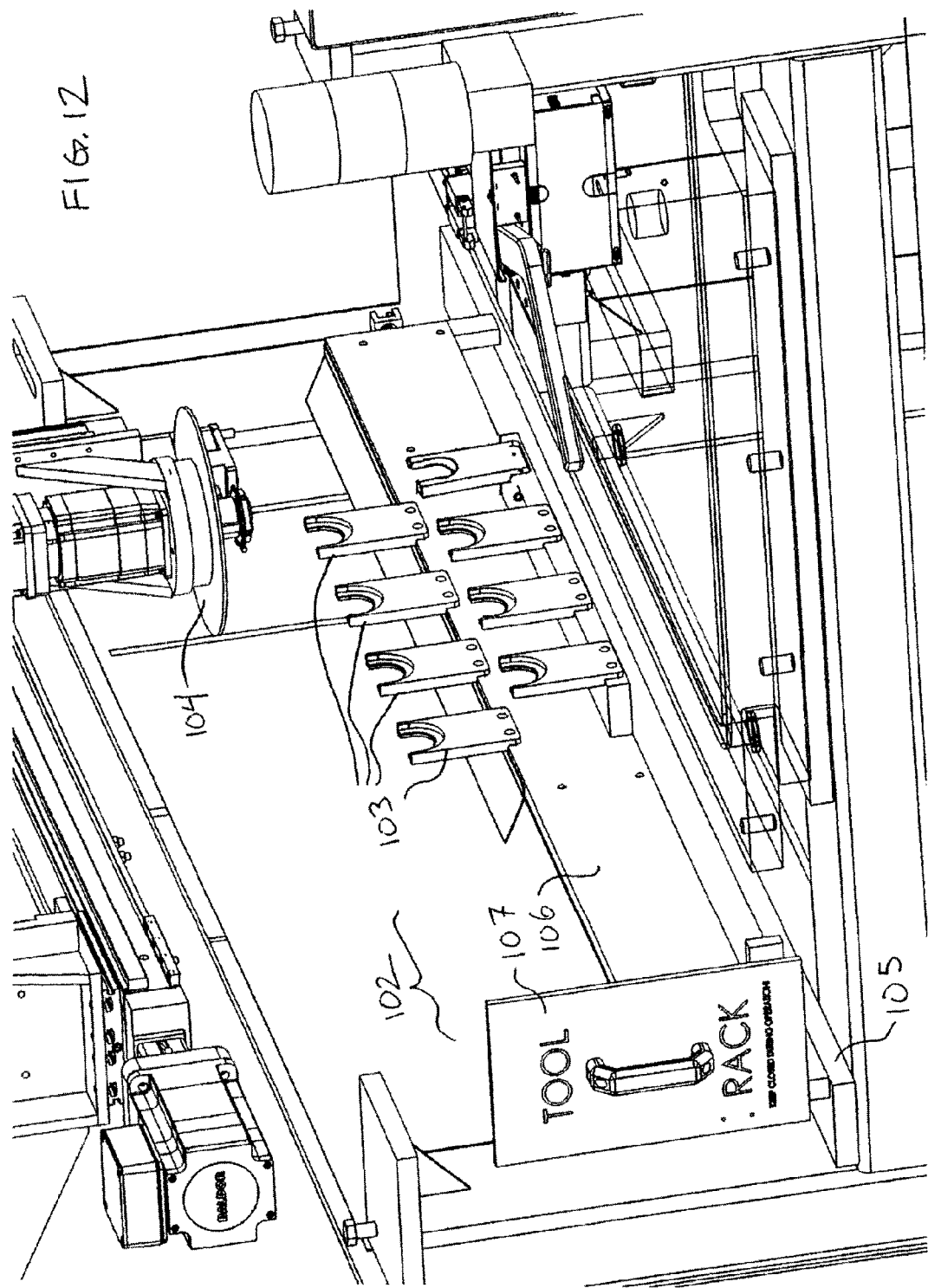

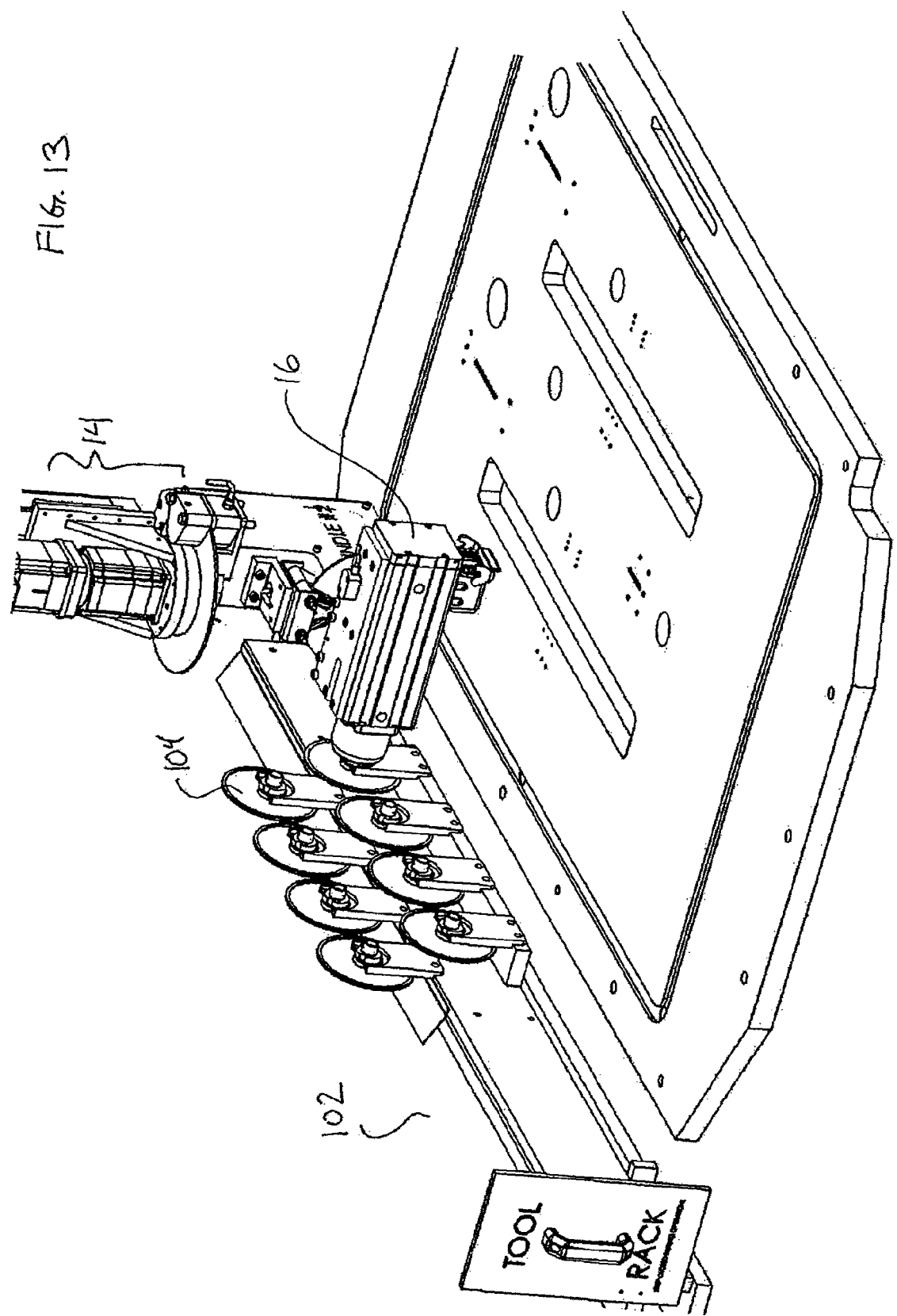

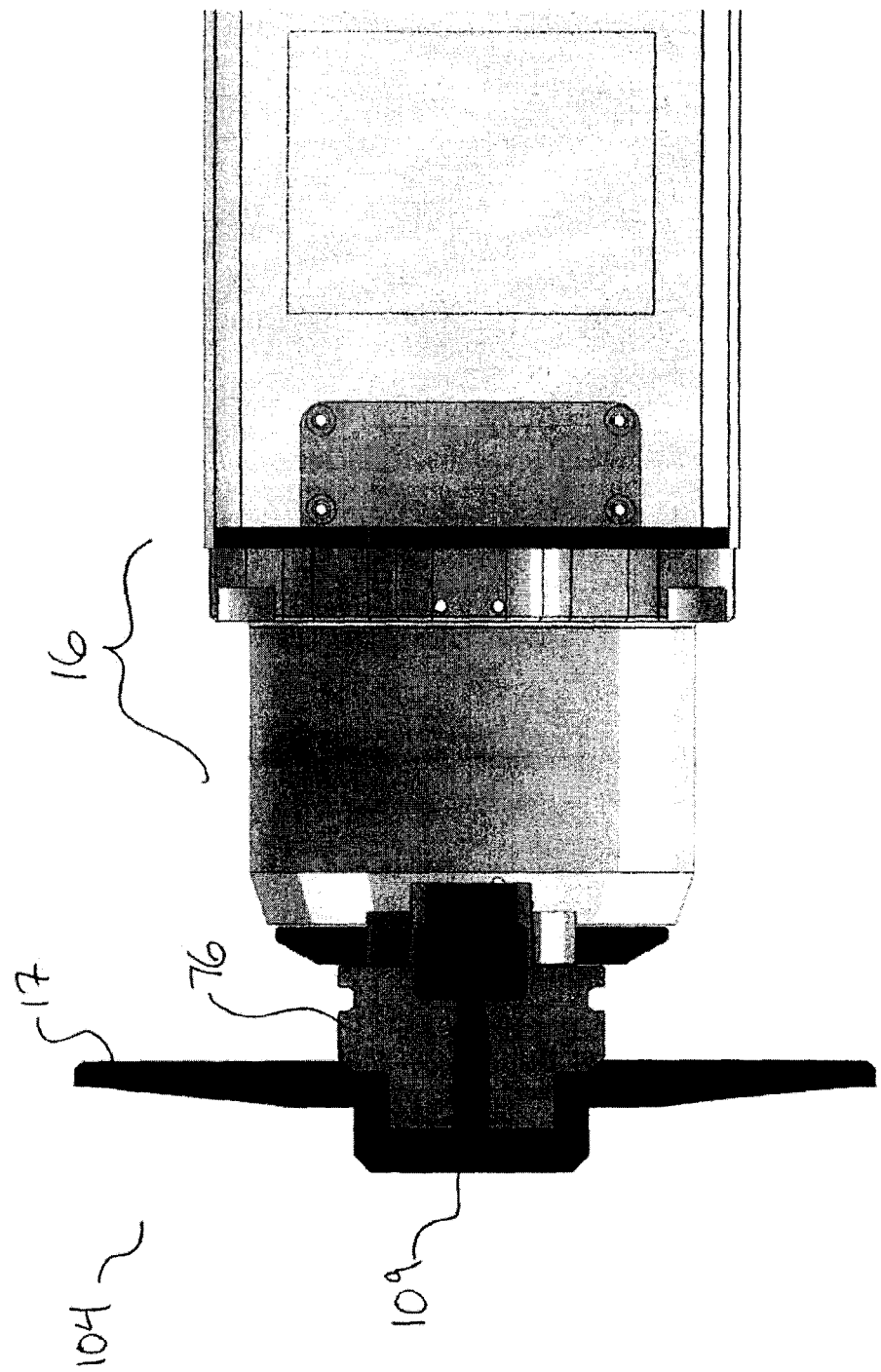

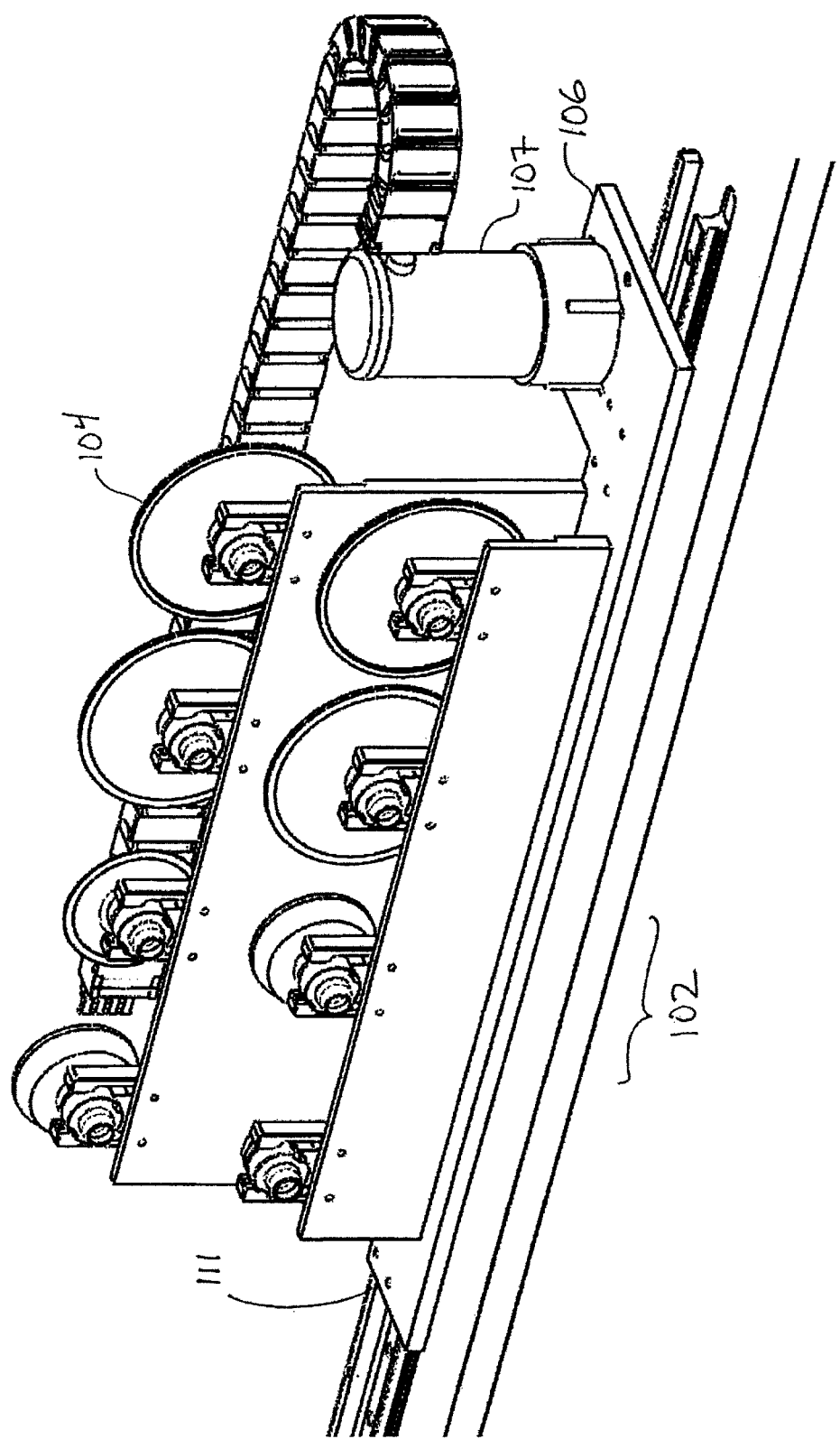

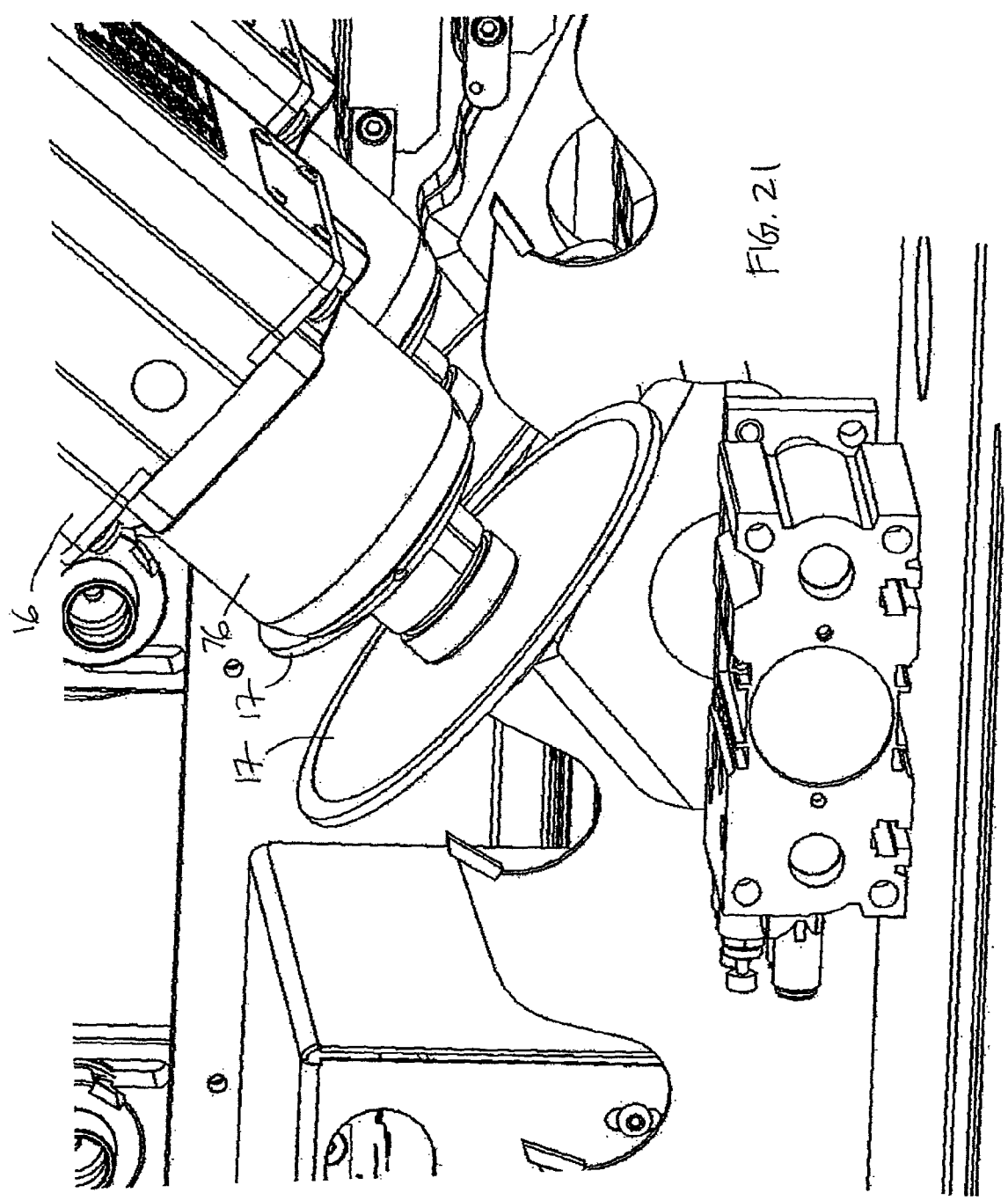

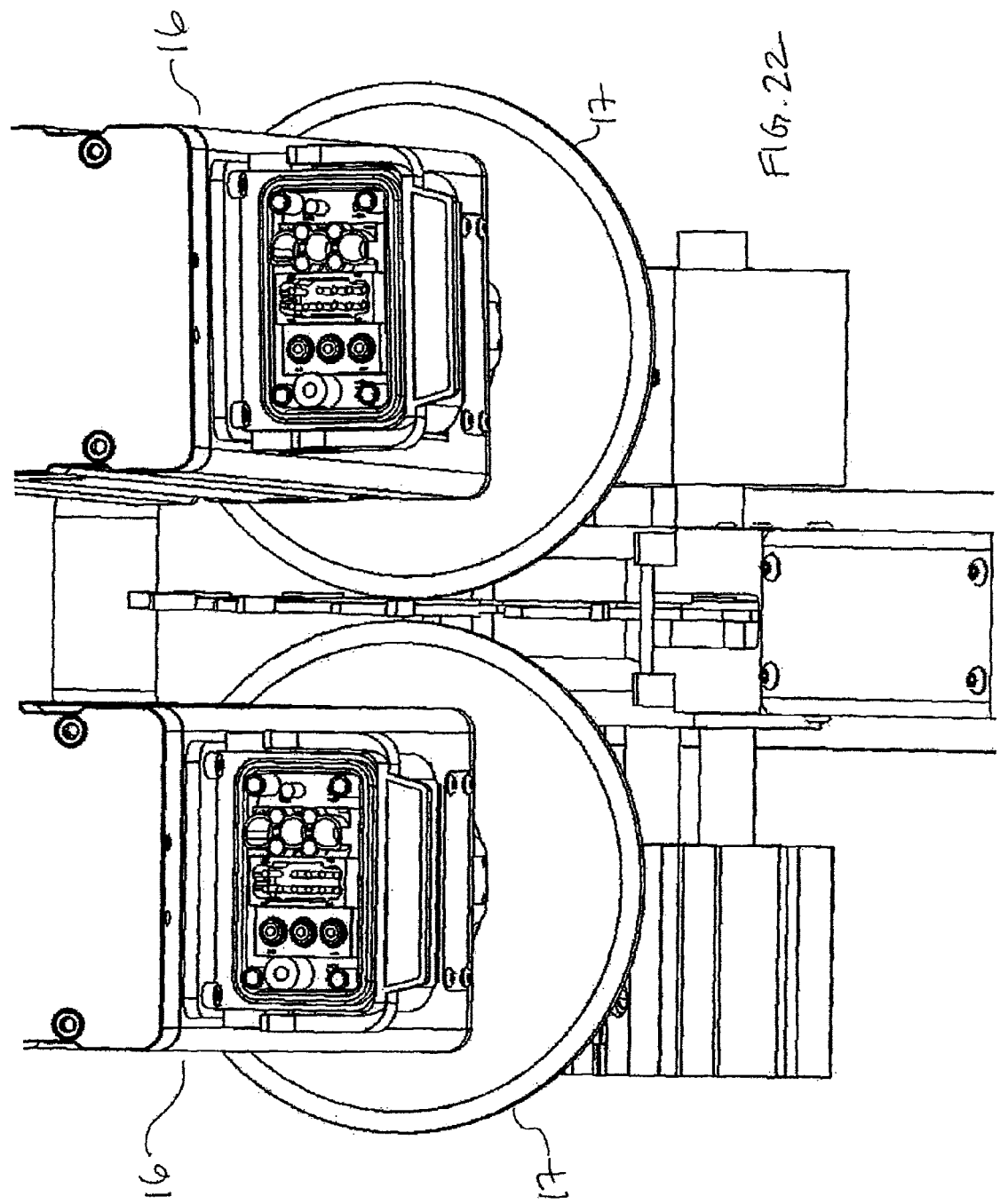

COMPUTER CONTROLLED MULTIPLE AXIS GRINDING MACHINE FOR GRINDING SAW BLADES

CROSS-REFERENCE TO RELATED APPLICATIONS

This application is a US National Stage of International Application No. PCT/CA2012/050932, filed 21 Dec. 2012, which claims the benefit of U.S. Provisional Application No. 61/580,065, filed 23 Dec. 2012 and U.S. Provisional Application No. 61/600,382, filed 17 Feb. 2012, each herein fully incorporated by reference.

FIELD

This invention relates generally to saw grinding machines.

BACKGROUND

Computer Numerical Control (CNC) grinding machines are becoming increasingly common with the recent advances in computer controlled machinery. One type of CNC grinding machine is a CNC saw grinder. These machines are used to sharpen saw teeth on saw blades, and there are a number of types: face and top grinding machines; side grinding machines; steel relieving and profiling machines; and shape plunge grinding machines.

CNC face and top grinding machines use a grinding wheel that is controlled by a CNC multiple axes manipulator which orient and move a grinding wheel against a saw blade tooth in order to sharpen a face and a top of a tooth. Similarly, side grinding machines move a grinding wheel against a saw blade tooth to sharpen a side of the tooth. Side grinding machines known as dual side grinders use a pair of grinding wheels to simultaneously grind both sides of a saw tooth. A steel relieving machine will remove some steel from behind the tooth tip in order to allow for more sharpening without needing a new tip; while a profiling machine will in addition grind the gullet and body of the tooth as well. A shape plunge grinding machine uses a shaped grinding wheel, e.g. V-shape, to make that shape on the top of the tooth.

In order to perform a complete sharpening, each saw blade must be first sharpened by one of the face and top grinding machine and the side grinding machine, then removed and transferred to the other of the two machines to complete the sharpening process. This means that each saw blade must be loaded into two separate machines. It would be desirable to reduce this two step process into a single step, in order to achieve one or more of: faster processing times, reduced machinery cost, and a reduced footprint of machinery.

SUMMARY

According to one aspect of the invention there is provided a saw grinding apparatus comprising a saw blade mount for mounting a saw blade thereto; and at least one computer numerically controlled multiple axes (CNC) grind wheel manipulator having a spindle connectable to a grind wheel. The manipulator is movable along at least three linear axes and rotatable about at least two rotational axes to position the grind wheel in at least three tool grinding positions against a tooth of the saw blade. These positions enable the grind wheel to perform grinding operations including at least a top grind, a face grind, and a side grind of the tooth when the saw blade is fixedly mounted to the saw blade mount.

More particularly, the manipulator can comprise an X-axis linear module, a Y-axis linear module movably mounted to the X-axis linear module along an X-axis, a Z-axis linear module movably mounted to the Y-axis linear module along a Y-axis, and a two axes rotary joint sub-assembly movably mounted to the Z-axis linear module along a Z-axis. The two axes rotary joint sub-assembly can comprise an A-axis rotary joint, a B-axis rotary joint rotatably mounted to the A-axis rotary joint about an A-axis, and a spindle mount rotatably mounted to the B-axis rotary joint about a B-axis and connected to the spindle.

The apparatus can further comprise a grind plate with a pair of saw blade openings for respectively receiving a saw blade therethrough, and a pair of grind wheel manipulators mounted to the grind plate such that each grind wheel manipulator can be positioned relative to the saw blades extending through the saw blade openings to perform a top grind and a face grind of one of the saw blades. Further, the pair of manipulators can be positioned to perform a dual side grind on each of the saw blades.

The saw grinding apparatus can further comprise a controller communicative with the at least one grinding tool manipulator and the saw blade mount, and a processor with a computer readable medium storing a computer-aided manufacturing (CAM) program with program code executable by the processor to provide commands to the controller to perform a method comprising: moving the saw blade mount into a loading position; after one or two saw blades have been mounted to the saw blade mount, moving the saw blade mount into a sharpening position such that at least part of the saw blade(s) extend through the saw blade opening(s); rotatably advancing a tooth of the saw blade(s) into a tooth grinding position and securing each saw blade in the tooth grinding position; mounting a grinding tool to the grinding tool manipulator(s), and moving the grinding tool manipulator(s) into one of the tool grinding positions wherein the grinding tool can perform a selected grind operation on the tooth of the saw blade(s); and performing the selected grind operation.

The selected grind operation can be selected from a group consisting of the top grind, the face grind, the side grind, a steel relieving grind, a profiling grind, and a shape plunge grind. When the selected grind operation is a side grind, the tool grinding position locates each grinding tool at a respective side of the tooth of one of the saw blades, and performs the grind operation which comprises performing a side grind on the one of the saw blades. When the selected grind operation is a top grind or a face grind, the tool grinding position locates one of the grinding tools at the tooth of each saw blade such that a top grind or a face grind can be performed simultaneously on both of the saw blades.

According to another aspect of the invention, there is provided a saw grinding apparatus comprising a saw blade mount for mounting a saw blade thereto; a tool rack comprising multiple tool bays each for storing a grinding tool; and at least one of the aforementioned computer numerically controlled (CNC) multiple axes grind wheel manipulators. The manipulator includes a spindle connectable to a grinding tool and is movable to a tool grinding position wherein a grinding operation can be performed on a saw blade mounted to the saw blade mount. The manipulator is also movable to a tool change position wherein the spindle can engage a grinding tool stored in a tool bay and can deposit a grinding tool in an empty tool bay.

The saw grinding apparatus can further comprise a housing. In such case, the tool rack further comprises a track assembly fixed relative to the housing and a slider movable relative to track assembly between a loading position wherein the tool bays are outside of the housing and a stored position wherein the tool bays are inside the housing. At least some of the tool bays can comprise a U-shaped fork, in which case the grinding tool comprises a tool holder having an annular groove configured to engage the U-shaped fork such that the grinding tool is seated in the tool bay.

The apparatus can further comprise a computer readable medium storing a computer-aided manufacturing (CAM) program with program code executable by the processor to provide commands to the controller to perform a method comprising: moving the saw blade mount into a loading position; after one or two saw blades have been mounted to the saw blade mount, moving the saw blade mount into a sharpening position such that at least part of the saw blade(s) extend through the saw blade opening(s); rotatably advancing a tooth of the saw blade(s) into a tooth grinding position and securing each saw blade in the grinding position; moving the grinding tool manipulator into a tool change position and mounting a grinding tool to the grinding tool manipulator suitable to perform a selected grind operation; moving the grinding tool manipulator(s) into one of the tool grinding positions wherein the grinding tool can perform the selected grind operation on the tooth of the saw blade(s); performing the selected grind operation; and moving the grinding tool manipulator into the tool change position and depositing the grinding tool in an empty tool bay.

BRIEF DESCRIPTION OF DRAWINGS

FIGS. 2(a) to (c) are respective upper and lower perspective views the manipulators mounted to a gantry frame of the saw grinding machine.

FIG. 5 is a perspective view of a grind plate, paddle sub-assembly, feed finger sub-assembly and saw clamp of the saw grinding machine.

FIGS. 6(a) and (b) are perspective and front views of the grind plate and a saw blade mount sub-assembly of the saw grinding machine.

FIG. 7 is a perspective view of the paddle sub-assembly.

FIG. 8 is a perspective view of the feed finger sub-assembly.

FIG. 11 is a perspective view of a tool rack of the saw grinding machine comprising tool bays for storing grinding tools.

FIG. 12 is a perspective view of the tool rack slidably mounted within a housing of the saw grinding machine.

FIG. 13 is a perspective view of the rotary joint and spindle assembly positioned to obtain a grinding tool from the tool rack.

FIG. 14 is a top view of a grinding wheel and tool holder mounted to a spindle.

FIG. 15 is a perspective view of a motorized tool rack of the saw grinding machine according to another embodiment.

FIG. 21 is a detailed perspective view of the spindle and grinding tool of the two manipulators performing a side grind on a tooth of a saw blade in a side grinding operation.

FIG. 22 is a top view of the spindle and grinding tool performing the side grind shown in FIG. 21.

DETAILED DESCRIPTION OF EMBODIMENTS OF THE INVENTION

Figure 1A:
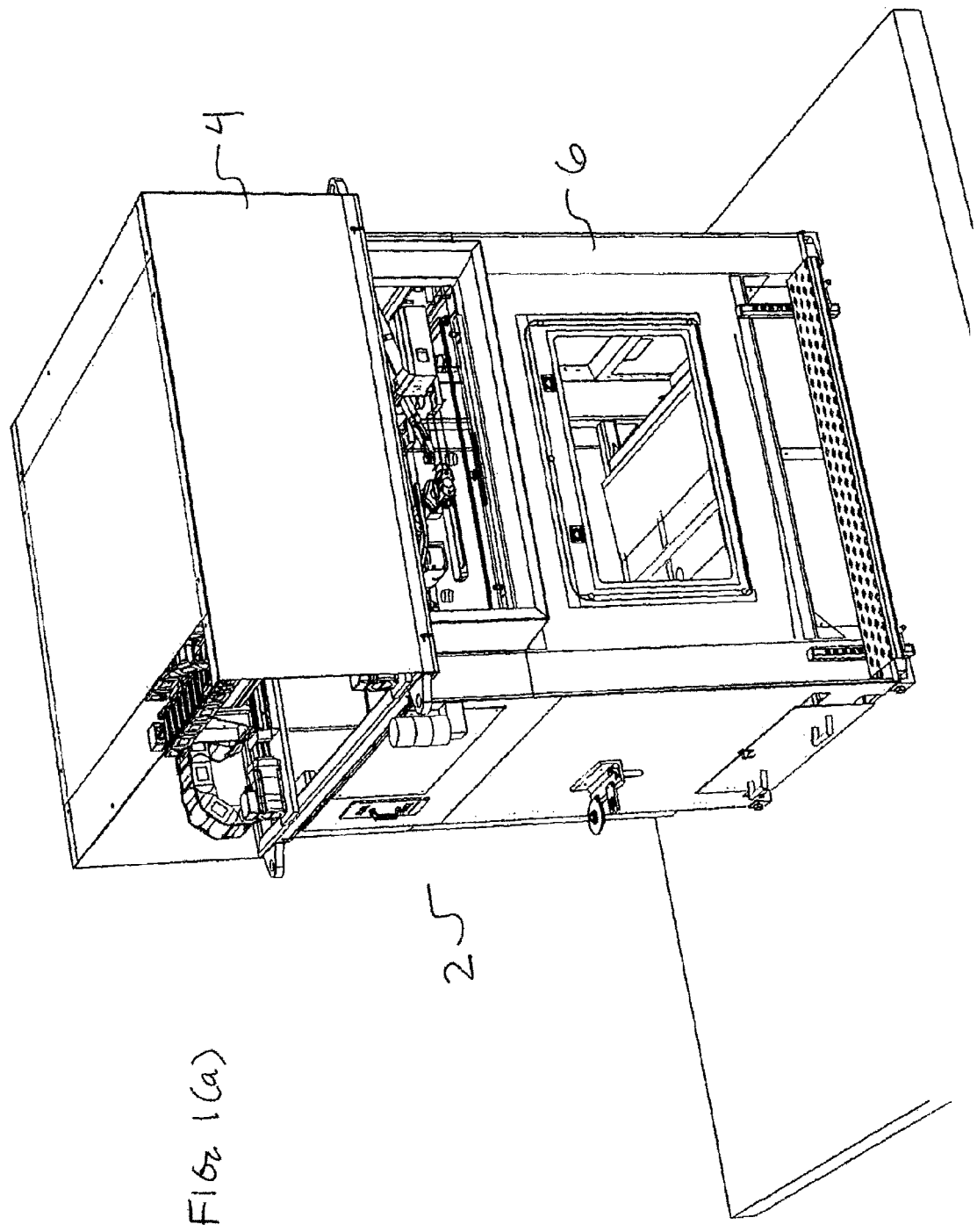
FIGS. 1(a) and (b) are perspective exterior and cut-away views of a saw grinding machine having multiple axes grinding wheel manipulators according to one embodiment of the invention.

Directional terms such as "up", "down", "above" and "below" are used in this description merely to aid in describing the embodiments of the invention and are not to be construed as limiting the embodiments to any particular orientation during operation or in connection to the environment or another object.

Referring to FIGS. 1 to 10 and according to one embodiment of the invention, there is provided a saw grinding machine 2 having a pair of CNC multiple axes grinding wheel manipulators that can perform a top grinding, face grinding and a side grinding to each tooth in a saw blade, all within the machine 2 and without having to remove the saw blade from the machine 2 between grinding operations.

Referring to FIGS. 1 to 5, the major components of the saw grinding machine 2 are: a housing 4, a stand 6, a gantry sub-assembly 12 mounted on the stand 6, a pair of rotary joint sub-assemblies 14 mounted on the gantry sub-assembly 12, a spindle 16 mounted to each rotary joint sub-assembly 14 and for holding a grind wheel 17, a grind plate 18 below the gantry sub-assembly 12, saw blade mounting equipment located below and on the grind plate 18 (not shown in FIG. 1), and a coolant tank 28 at the bottom of the saw grinding machine 2. The pairs of gantry sub-assemblies 12, rotary joint sub-assemblies 14 and spindles 16 collectively form a pair of multiple axes grinding wheel manipulators which can be computer numerically controlled in five independent axes to move an attached grind wheel 17 into a desired grinding position. Referring to FIGS. 5 to 10, the saw blade mounting equipment comprises a saw blade mount 20 for rotatably mounting a saw blade to the grinding machine 2, a paddle sub-assembly 22 for setting the saw blade position, a feed finger sub-assembly 24 for advancing each tooth of the saw blade into a sharpening position, and a saw clamp 26 for clamping the saw blade in place for sharpening.

Gantry Sub-Assembly

Referring now to FIGS. 2(a) to (c), the gantry sub-assembly 12 serves to move the grind wheel 17 along three linear axis: X, Y, and Z. The gantry sub-assembly 12 comprises a gantry frame 29 which is mounted on top of the stand 6 and defines a large opening to receive the grind plate 18. A pair of parallel-spaced X-axis linear modules ("first and second X-axis linear modules" 30, 32) are respectively fixedly mounted on each side of the gantry frame 29. A pair of Y-axis linear modules ("first and second Y-axis linear modules 34, 36) are respectively movably mounted on the X-axis linear modules 30, 32 and are horizontally movable back and forth along the length of the X-axis linear modules" 30, 32; this direction is hereinafter referred to as the X-axis. Finally, a pair of Z-axis linear modules ("first and second Z-axis linear modules" 38, 39) are respectively movably mounted on the Y-axis linear modules and are horizontally movable back and forth along the length of the Y-axis linear modules 34, 36; this direction is hereinafter referred to as the Y-axis. As will be described below, each rotary joint sub-assembly 14 (not shown in FIG. 2) is movably mounted to one of the Z-axis linear modules 38, 39 and vertically movable up and down along the length of the Z-axis linear module; this direction is hereinafter referred to as the vertical Z-axis.

Each linear module 30, 32, 34, 36, 38, 39 comprises a longitudinally extending member having a pair of ball rails and a ball screw, and a servo motor 40 driving the ball screw. Each Y-axis linear module 34, 36 has a pair of downwardly-extending end couplings 37 which are each slidably coupled to the ball rails of one of the X-axis linear modules 30, 32 such that each Y-axis linear module 34, 36 is slidable along the length of the X-axis linear modules 30, 32 in the X-axis direction. One of the end couplings 37 in each Y-axis linear module 34, 36 is coupled to the ball rail in one of the X-axis linear modules 30, 32, such that the servo motor 40 of one X-axis linear module drives one Y-axis linear module 34, 36 and the servo motor of the other X-axis linear module 30 drives the other Y-axis linear module 34, 36. Similarly, each Z-axis linear module 38, 39 has one end coupling 44, which are each respectively movably coupled to the ball rails of one of the Y-axis linear modules 34, 36. Each end coupling 44 is also coupled to the ball screw of the associated Y-axis linear motor 34, 36 such that the servo motor 40 of that Y-axis linear motor 34, 36 moves the associated Z-axis linear module 38, 39 along the Y-axis. Each Z-axis linear module 38, 39 also has a servo motor 40 which drives a ball screw coupled to one of the rotary axis joint sub-assemblies 14, to move one of these rotary joint sub-assemblies 14 along the Z-axis.

A plurality of cable trays 45 are mounted on the gantry frame 29, and the X-axis and Z-axis linear modules 30, 32, 38, 39 and serve to route a plurality of cables (not shown) to components of the gantry sub-assembly 12 as well as to components mounted to the gantry-sub assembly 12. These cables include a power line to each servo motor 40, signal cables to each servo motor 40, air lines for air-powered brakes and the spindles 16, and signal cables for a number of sensors including: proximity switches (not shown) mounted to linear modules 30, 32, 34, 36, 38, 39 to serve as hardware limit switches and position calibration switches, and vibration sensors.

Rotary Joint and Spindle

Figure 3:
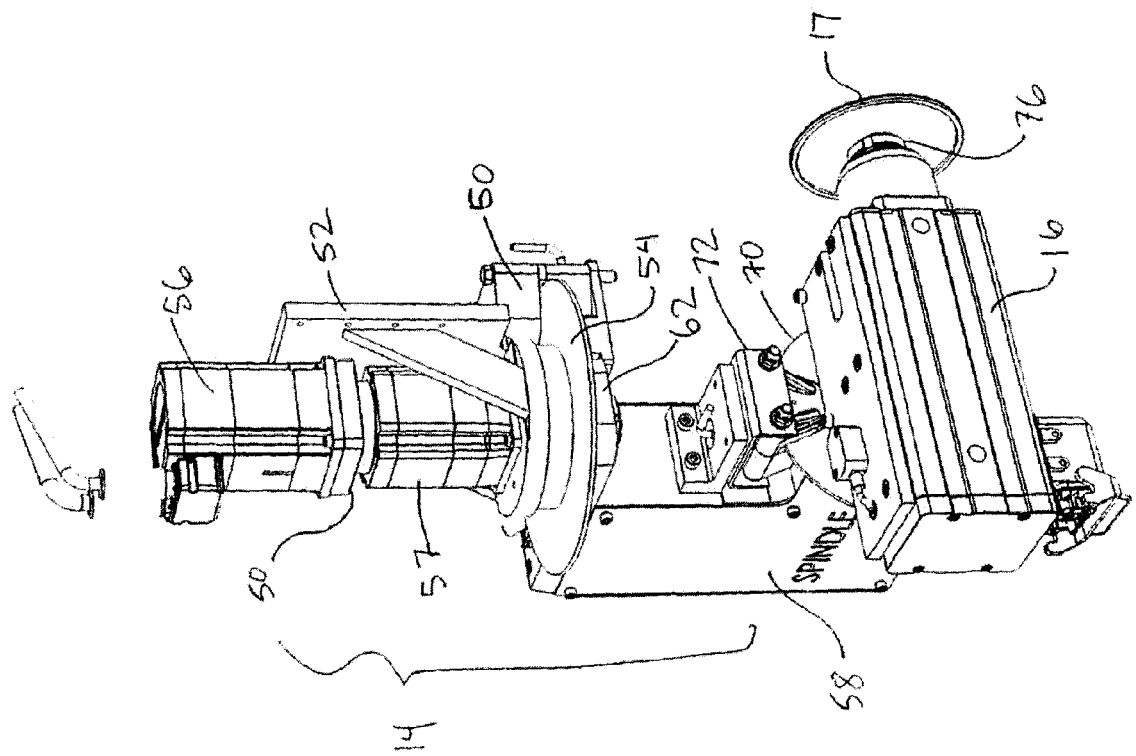
FIG. 3 is a perspective view of a rotary joint and spindle sub-assembly of the saw grinding machine.
Figure 4:
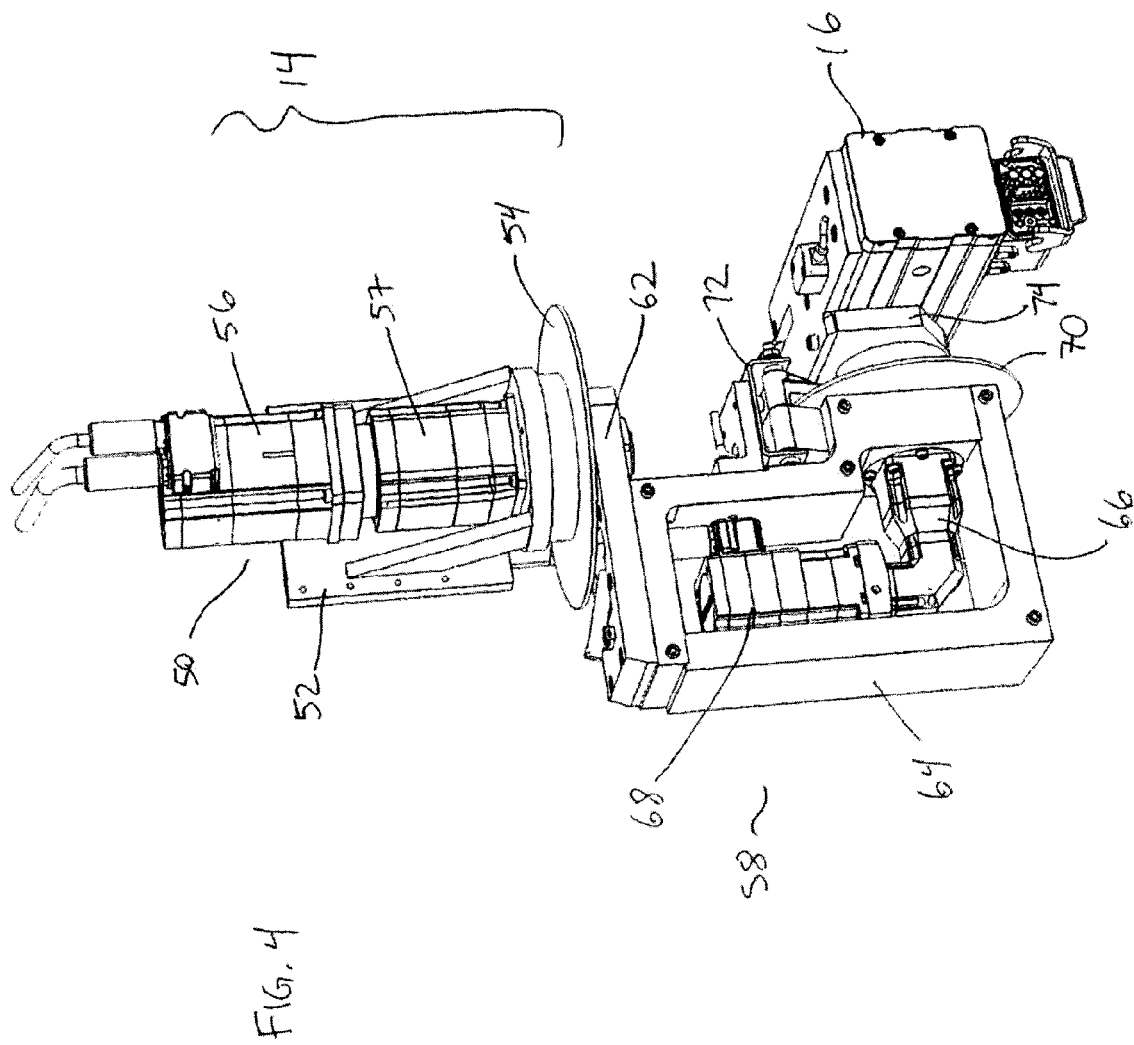
FIG. 4 is a perspective detailed cut-away view of the rotary joint and spindle sub-assembly.
Figure 10:
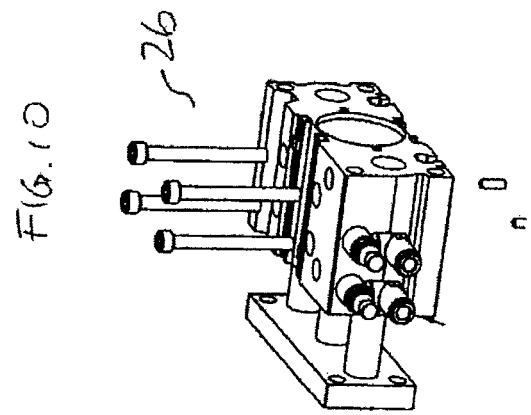
FIGS. 9 and 10 are exploded and assembled perspective views of the saw clamp.
Figure 9:
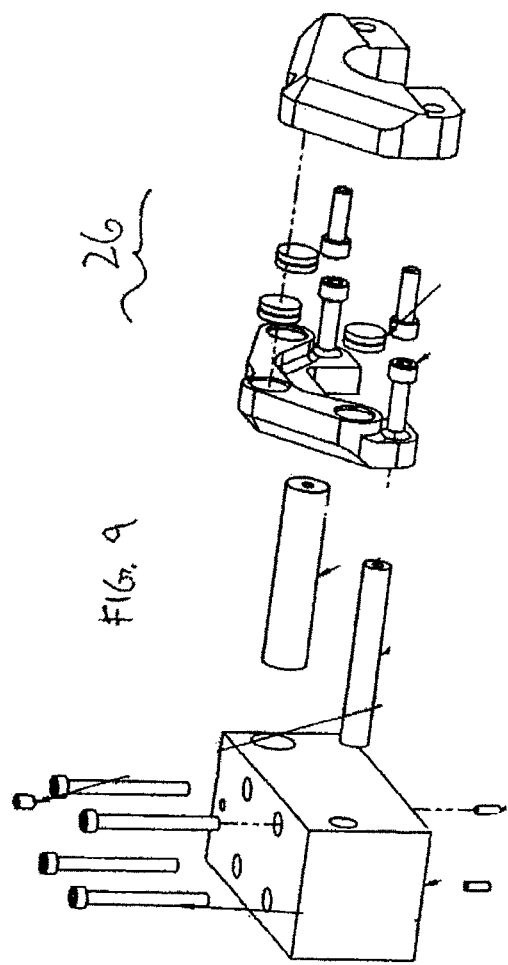
Figure 16:
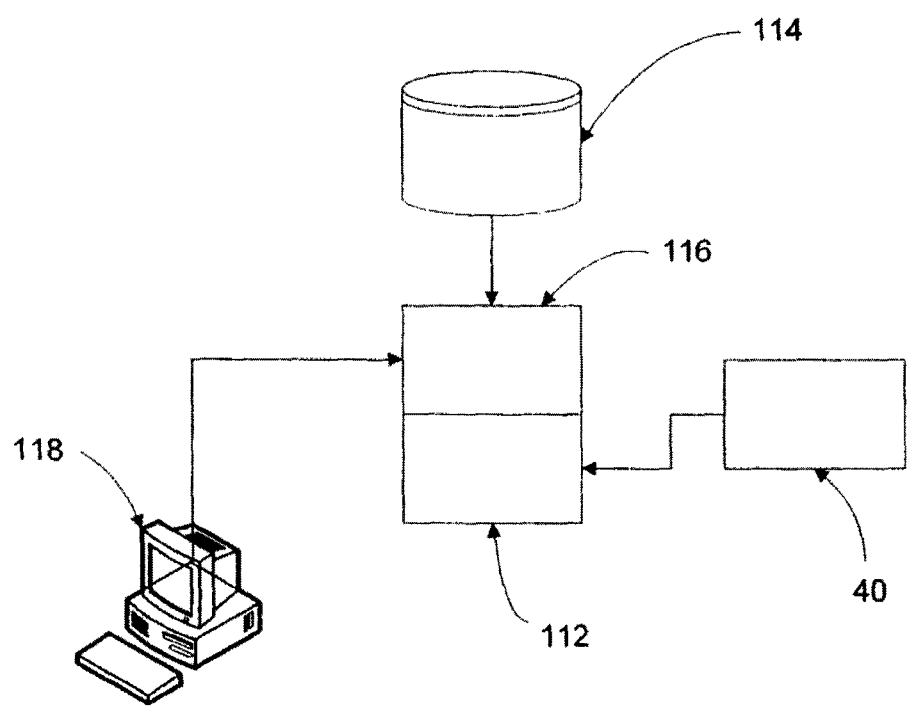
FIG. 16 is a schematic view of a CNC system for performing grinding and tool changing operations in the saw grinding machine.

Referring now to FIGS. 2 to 4, each rotary joint sub-assembly 14 has an A-axis rotary module 50 and a B-axis rotary module 58 each capable of rotating about an axis; the A-axis rotary module 50 rotates the B-axis rotary module 58 about a vertical A-axis and the B-axis rotary module 58 rotates the spindle 16 about a horizontal B-axis. Together with the coupled X, Y and Z axis linear modules 30, 32, 34, 36, 38, 39, each rotary joint sub-assembly 14 form a CNC multiple-axis manipulator that can manipulate an attached grind wheel 17 in five independently controllable axis.

The A-axis rotary module 50 comprises an A-axis vertical connection plate 52 which is vertically movably mounted to one of the Z-axis linear modules 38, 39. An A-axis rotor 54 is horizontally and rigidly mounted to the end of the A-axis vertical connection plate 52. An A-axis servo motor 56 is also mounted to the A-axis vertical connection plate 52 and has a gear box and drive shaft 57 extending vertically downwards and connecting to a lateral connection plate 62 of the B-axis rotary module 58; the servo motor 56 rotates the B-axis rotary module 58 about the vertical A-axis.

An A-axis brake caliper 60 is rigidly mounted to the B-axis lateral connection plate 62 and can operate to clamp on the A-axis rotor 54 thereby securing the relative positions of the A and B-axis rotary modules 50, 58. The B-axis lateral connection plate 62 is coupled to a B-axis mounting frame 64 to which is mounted a B-axis gear box 66 which has a drive shaft extending therefrom to couple to and rotate a spindle mount 74. A B-axis servo motor 68 is coupled to the B-axis gear box 66 to drive the gear box 66.

A B-axis rotor 70 is rigidly mounted on the spindle mount 74. A B-axis brake caliper 72 is rigidly mounted to the B-axis mounting frame 64 and is designed to clamp on to the rotor, thereby fixing the position of the spindle mount 74 to the B-axis rotary module 58.

The spindle 16 is fixedly mounted to the spindle mount 74 and has a clamping system for clamping onto a tool holder 76. The tool holder 76 is attached to the grind wheel 17 and serves as the means for coupling the grind wheel 17 to the spindle 16. Different grind wheels 17 can be used to grind different parts of the saw tooth, and each grind wheel 17 is fixed to its own tool holder 76 which can be removably mounted to the spindle 16 by the spindle's clamping system. For example, a topping grind wheel (not shown) as known in the art can be used to perform a top grind of the tooth; a face grind wheel as known in the art can be used to perform a face grind of the tooth; and a side grind wheel as known in the art can be used to perform a side grind of the tooth. Other optional grind wheels that can be used in the grinding machine 2 include a V-top grind wheel, chip-break grind wheel, hollow-top grind wheel, and hollow-face grind wheel (none shown).

As noted above, the cable trays 55 direct a number of cables (not shown) to the rotary joint and spindle sub-assemblies. In particular, the brakes calipers 60, 72 are air powered and receive air from the air lines; each servo motor 56, 68 is electrically powered and receives power from power lines. The spindle 16 is also electrically powered and is coupled to a power line, as well as to air lines to provide cooling and to clean parts of the spindle 16, and to signal cables to send and receive data from various sensors and components of the spindle 16, including an RPM sensor, temperature sensor, and a sensor for detecting the presence of the tool holder 76.

Grind Plate and Saw Blade Mount

Referring now to FIGS. 5 to 10, the grind plate 18 is provided with openings 80, 82 to receive a pair of saw blades (not shown) and a pair of coolant inlets 84, 86 which receive a pair of coolant lines (not shown) fluidly coupled to the coolant tank 28 and a pump (not shown) which is operated to spray a liquid coolant or oil onto the saw blades during the sharpening operation.

A pair of saw blades (not shown) are each mounted to a respective saw blade mount, which is used to load the saw blades into the grinding machine 2 and to position the saw blade in a position for sharpening. More particularly, each saw blade is rotatably mountable to an arbor shaft 88 of the saw blade mount 20 located beneath the grind plate 18. The arbor shaft 88 is vertically movably mounted to a vertical linear module 92, and the vertical linear module 92 is horizontally movably mounted to a horizontal linear module 94. The vertical linear module 92 can be pneumatically moved along the horizontal linear module between a loading position where a saw blade can be mounted onto the arbor shaft 88, and a sharpening position directly underneath the grind plate openings 80, 82. A gear motor 96 is coupled to the linear module 92 and can be operated to move the arbor shaft between a lowered loading position for receiving a saw blade and an elevated sharpening position (externally signaled), wherein the mounted saw blade is elevated through the grind plate opening 80, 82 into position for sharpening.

A pair of saw clamps 26 are each mounted on the grind plate 18 over the openings 80, 82 and can be operated to clamp each saw blade in place for the sharpening operation. Also, a pair of feed finger sub-assemblies 24 are each mounted on the grind plate 18 at one end of the openings 80, 82 and are controlled to index each saw tooth of the saw blade into a sharpening position. The paddle sub-assembly 22 is mounted on the grind plate 18 between the openings 80, 82 and comprises a pair of paddle arms 100 which each can be horizontally pivotably moved into a contact position over the openings 80, 82 to contact a saw blade tooth that has been elevated upwards through the opening 80, 82 by the saw blade mount 20, and be pivoted away into a retracted position once the saw tooth is positioned in the correct vertical position by the paddle arm 100.

Tool Rack

Referring now to FIGS. 11 to 15, the saw grinding machine 2 is provided with a tool rack 102 comprising multiple tool bays 103 for storing multiple grinding tools 104 that are used by the manipulators to perform different kinds of grinding operations. The tool rack 102 is located on the stand 6 inside the housing 4 and off to one side of the gantry sub-assembly 12. The tool rack 102 extends generally parallel to the second linear X-axis linear module 32 and is positioned so that it does not interfere with movement of the Y-axis linear modules 34, 36 along the X-axis linear modules 30, 32. The tool rack 102 is also positioned so that the tool bays 103 are in sufficient proximity that the spindle 16 of each rotary joint sub-assembly 14 can reach a tool holder 76 of a grinding tool 104 that is stored on the tool rack 102, as is illustrated in FIG. 14.

Further, the gantry sub-assembly 12 is designed so that each rotary joint sub-assembly 14 can move in an unimpeded manner to and from the tool bays 103 to return and obtain grinding tools 104. This can be accomplished by the Y-axis linear modules 34, 36 moving apart a sufficient distance to allow one of rotary joint sub-assemblies 14 to move along the Y-axes towards the tool bays 103.

Referring to FIGS. 1(b) and 12, the tool rack 102 is slidably mounted within the housing 4, such that a portion of the tool rack 102 can be pulled out of the housing 4 to provide an operator with access to the grinding tools 104; this enables the operator to service the tools 104, or to insert new tools for new grinding operations. The tool rack 102 comprises an elongated track assembly 105 that is fixed to the stand 6, and a slider 106 that is laterally slidable relative to the track assembly 105. In this embodiment, eight tool bays 103 are mounted on the slider 106 and each comprise a U-shaped fork that is configured to contact a groove in each tool holder 76 of each grinding tool 104. Each tool bay 103 is spaced apart to provide sufficient room for grinding tools 104 to occupy the tool bays 103 without touching each other.

According to another embodiment, the tool rack 102 can be provided with a stepper motor 107 to provide motorized movement of the tool rack 102. The stepper motor 107 is located at end of the slider 106 and drives a rack and pinion mechanism 111 to slide the location of the forks from inside the machine to a loading position outside the machine. An operator communicates wanting to change tools to the machine through a human-machine-interface and once ready, the machine will bring the slider 106 out of the housing 4 to allow access to the grinding tools 104.

As discussed previously, the spindle 16 has a clamping system for clamping onto a tool holder 76, and the tool holder 76 is attached to a grind wheel 17 to collectively form a grinding tool 104. Referring to FIG. 14, the tool holder 76 has an annular groove 108 which is configured to engage the U-shaped fork of each tool bay 103, such that the grinding tool 14 is securely mounted in the tool bay 103. A grind wheel 17 is securely mounted to a distal end of the tool holder 76 and clamped in place between the tool holder and a cap 109 using three capscrews. A proximal end of the tool holder 76 is configured to engage the clamping system of the spindle 16. The spindle 16 locks to the tool holder 76 by means of an internal draw bar and an external taper. This can be done to DIN standard 69063-6, or HSK-F.

CNC System

The grinding wheel manipulators of the saw grinding machine 2 are controlled by a computer numerically controlled (CNC) system 110 to perform various grinding operations on saw blades. In this connection and referring to FIG. 15, the CNC system 110 comprises a controller 112 for controlling the servomotors and other movable components of the saw grinding machine 2 such as the saw blade mount 20, a computer readable medium 114 such as a hard drive that stores a computer-aided manufacturing (CAM) program containing commands to perform procedures including grinding operations, a processor 116 for interpreting the CAM program to extract the commands used by the controller 112 to perform the procedures, and a human-machine interface (HMI) 118 that enables a human operator to communicate with the CNC system 110. Certain components for the CNC system 110 are commercially available, and include for example a NextMove™ motion controller by Baldor Electric Company which provides the functions of the servo motor controller and the CAM program processor. The HMI 118 can comprise a personal computer communicative with the motion controller and comprising a touch sensitive display screen and/or other input devices like a keyboard.

The CAM program includes a number of procedures, including procedures to perform one of more of the following grinding operations: a face grind, a top grind, a side grind, steel relieving grind, a profiling grind, and a shape plunge grind. Other procedures can be added to the CAM program if additional grinding operations are desired. Programming of the CAM grinding program can be performed by techniques well known in the art, and for example can be performed using G-code, parametric programming, or a proprietary programming language provided by a CNC component manufacturer. For example, Baldor Electric Company provides proprietary software called MintMT™ (Motion Intelligence Multi-Tasking) that is a structured BASIC-like programming language that employs keywords to program motion control moves to control compatible servo motors, such as Baldor's MicroFlex™ servo drives. In this connection, the servo motors 40 of the saw grinding machine 40 can be MicroFlex™ servo drives when the CNC system 110 uses Baldor's NextMove™ motion controller and the CAM program is programmed using the MintMT™ software.

In addition to a grinding procedure for each grinding operation, the CAM program also includes a procedure for changing grinding tools. That is, a tool changing procedure is executable by the processor 116 to extract commands for the controller 112 to obtain a grinding wheel from the tool bay 102 that is appropriate for the next grinding operation, and to return that tool back to the tool bay 102 after the grinding operation has been completed.

The following information is maintained as inputs for the tool changing procedure:
1. Type of tool, if any, attached to each of the two grinding heads
2. Type of tool, if any, placed in each of the eight tool bays
3. Type of tool required for the upcoming saw grinding operation The following is a description of the steps performed when the tool changing procedure is executed: A monitor screen of the HMI can display the current grinding operation (if any) and the grinding tool 104 being used in that operation. The screen can also show the tools that are currently stored on the tool bay, and the different grinding operations available. The operator can position the grinding tools into the tool bays 104 by using the graphical user interface on the screen to specify the placement of the different tools in the tool bay 102. The operator can also select the next grinding operation; the CAM program will determine the appropriate tool for that operation and where that tool is located (i.e. whether it is currently on the spindle 16 or in one of the tool bays 103). If the upcoming saw grinding operation requires a tool change, the controller 112 will instruct the appropriate manipulator to move the spindle 16 to the tool bay 103 that has the correct tool 104 for the specified grinding operation. If a grinding tool 104 is currently attached to the spindle 16, the CNC system 110 will first determine which bay 103 is empty, move the spindle 16 to that bay 103, instruct the clamping system to release the tool 104, then move the spindle 16 away. Then, the CNC system 110 will move the spindle 16 to the tool bay 103 having the appropriate grinding tool 104 and in particular the manipulator will move the spindle until the open clamping system engages the tool holder 76 of that tool 104; once engaged, the CNC system 110 will instruct the clamping system to close. The manipulator will then move away, ending the tool change procedure, and the grinding machine 2 is ready to perform the next grinding operation.

Grinding Operation

The following is a generalized description of a grinding operation, wherein certain steps can be included in each programmed grinding procedure of the CAM program.

In a grinding operation, the saw blade mount 20 is moved into its loading position (arbor shaft 88 in lowered position and extended outside of machine 2) and a pair of saw blades are mounted to the pair of arbor shafts 88. Alternatively, a single saw blade can be mounted to the saw blade mount 20 when only one saw blade is to be ground. The horizontal linear modules are moved into their loading positions underneath the grind plate openings 80, 82, and the gear motor 96 is actuated to elevate the saw blades through the openings 80, 82 into the sharpening position. Each paddle arm 100 of the paddle sub-assembly 22 is in its contact position and thus the top of each saw blade will contact its respective paddle arm 100. Once this vertical position has been reached, the paddle arms 100 are retracted, and a feed finger 102 of each feed finger sub-assembly 24 pivots towards the saw blade and extends to contact a tooth of the saw blade, and to rotatably advance that tooth into a proper position for sharpening ("tooth grinding position"). Once the saw tooth is in this position, the height is checked again with the paddle arm 100. Now that the tooth is in tooth the grinding position, the saw clamps 26 securely clamp each saw blade in the tooth grinding position.

Figure 17:
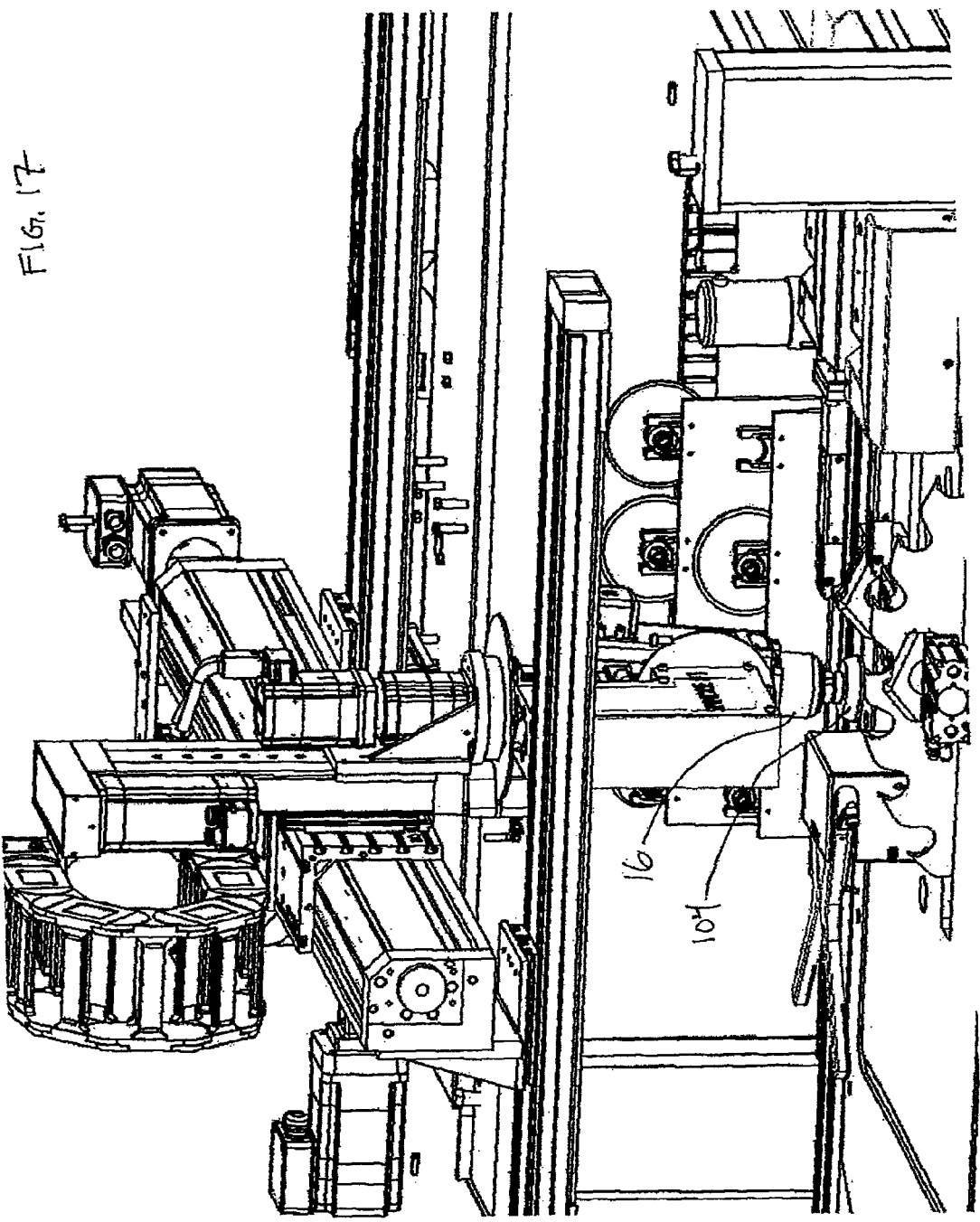
FIG. 17 is a perspective view of one of the manipulators performing a top grind on a tooth of a saw blade in a top grinding operation.
Figure 18:
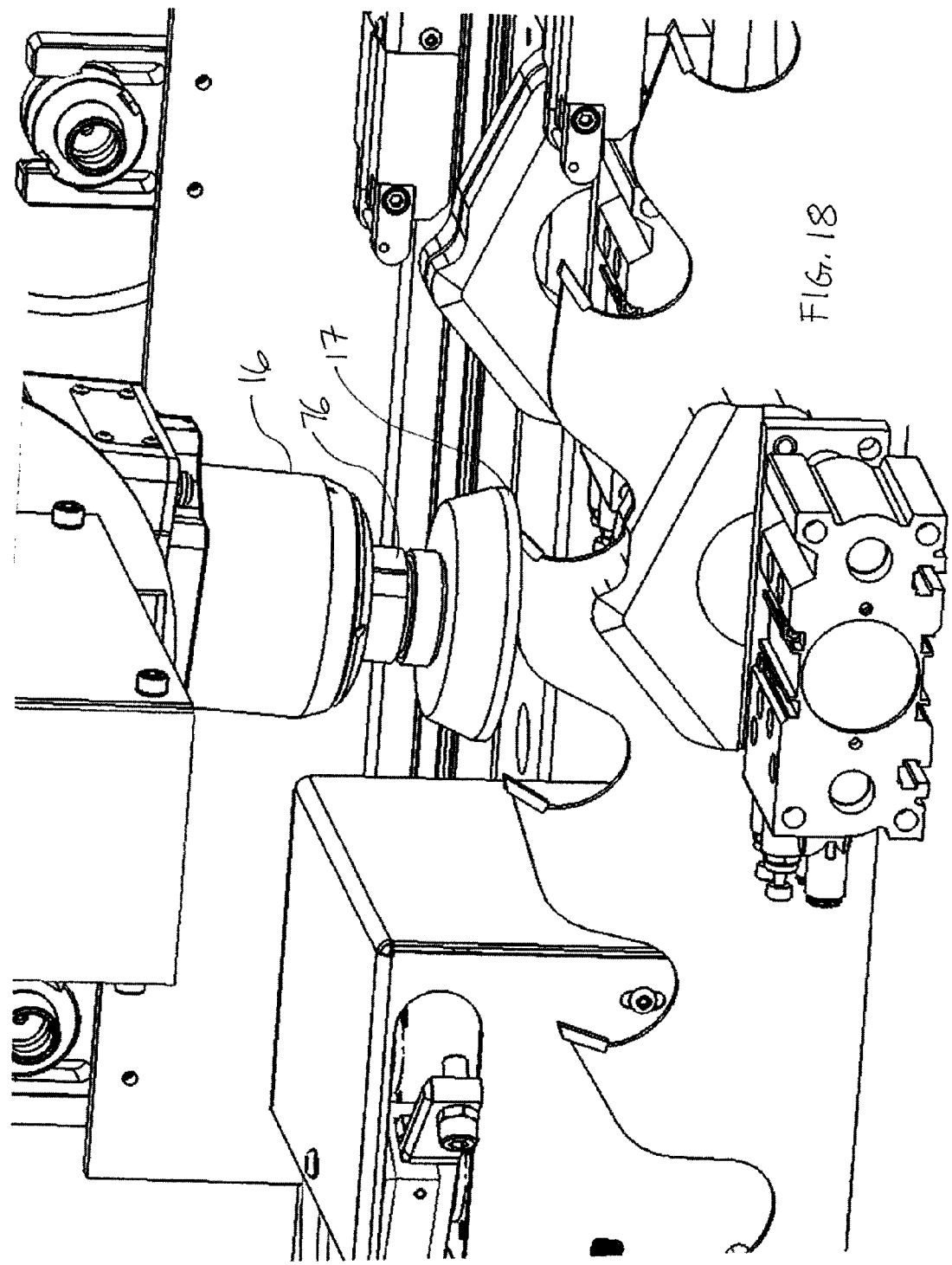
FIG. 18 is a detailed perspective view of the spindle and grinding tool performing the top grind shown in FIG. 17.

A grinding tool 104 with a suitable grinding wheel is mounted to each spindle 16; for example and as shown in FIGS. 17 and 18, for a top grind, a top grinding wheel is mounted to each spindle 16. Each mounted grinding wheel is then moved by its respective manipulator into a tool grinding position to grind the top of the tooth for each saw blade. Movement along the X, Y, Z axis and about the A and B axes are computer numerically controlled in a manner as described above and as known to one skilled in the art.

Figure 19:
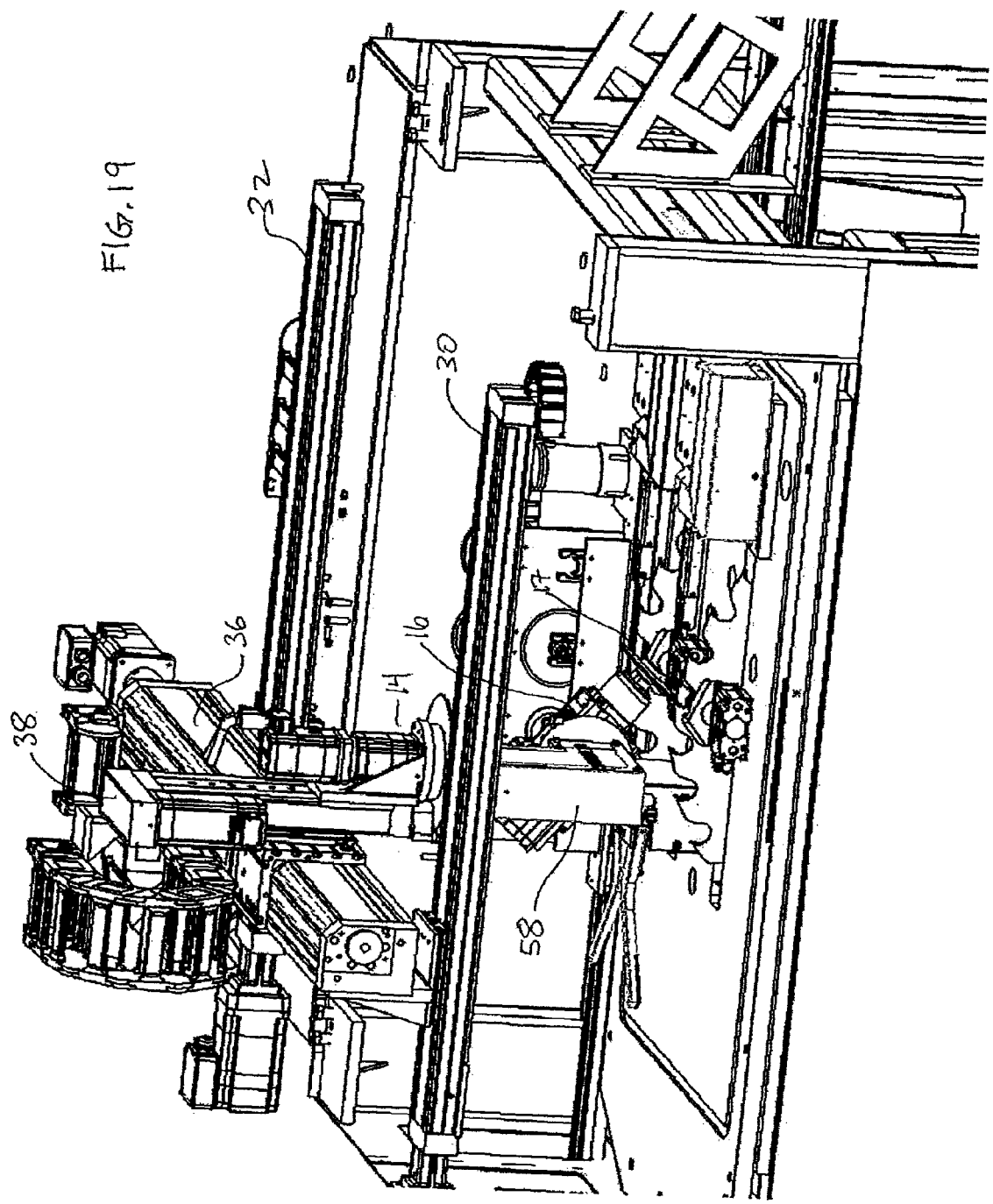
FIG. 19 is a perspective view of one of the manipulators performing a face grind on a tooth of a saw blade in a face grinding operation.
Figure 20:
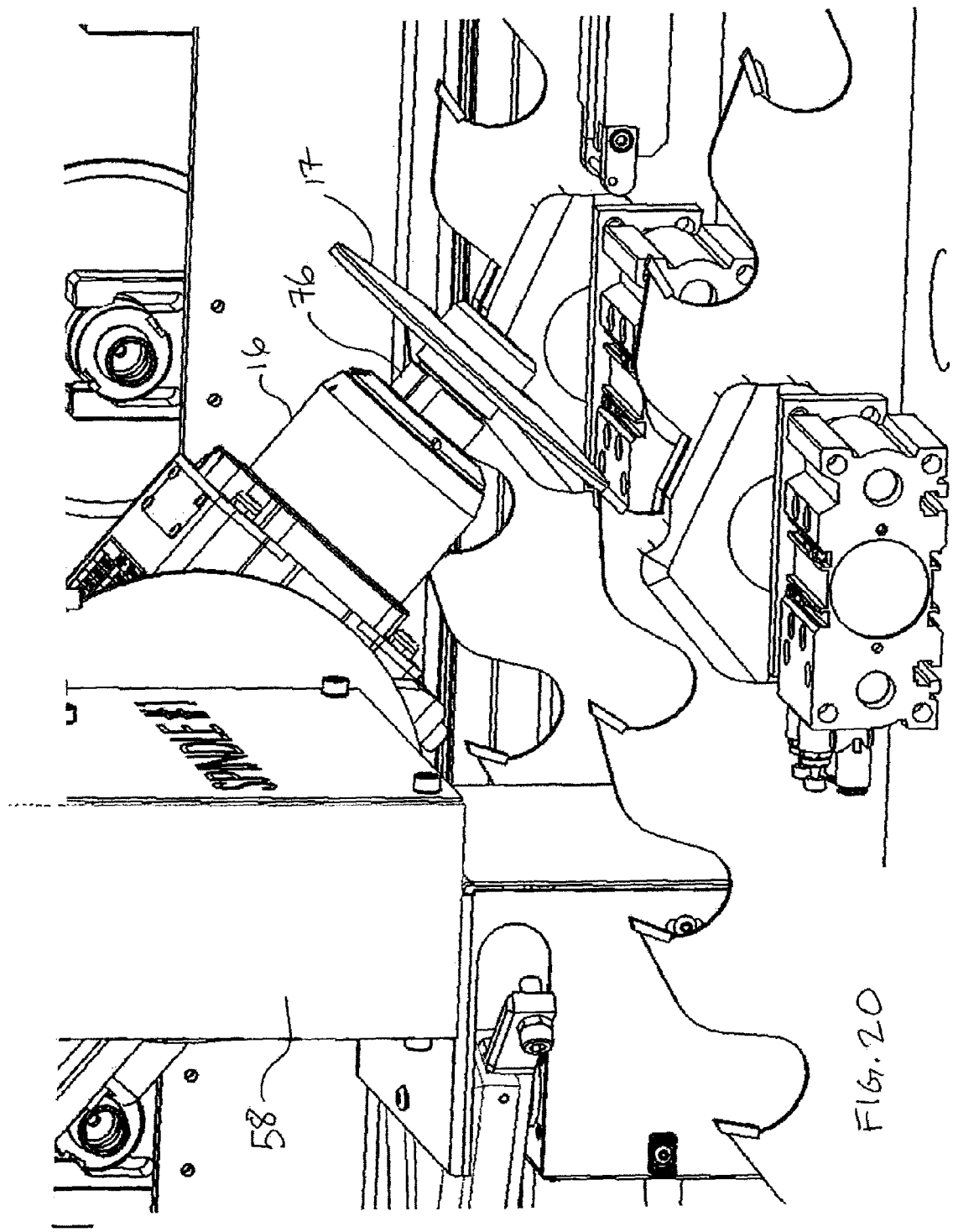
FIG. 20 is a detailed perspective view of the spindle and grinding tool performing the face grind shown in FIG. 19.

Once the grinding wheels are in their respective tool grinding positions, the coolant pump is turned on and coolant is sprayed on the saw blades via the coolant tubes. The spindle 16 is then activated and the grinding wheels are spun to grind the tooth. When the specific grinding operation has completed, each grinding wheel manipulator is moved away from the saw blade, and a new grinding wheel is mounted onto each spindle 16, e.g. a face grind wheel can be now mounted to each spindle 16. The old grinding wheel is returned to the tool rack 102 according to the tool changing procedure discussed above. The manipulators are then moved into a suitable position for a face grind and a face grinding operation is carried out, as shown in FIGS. 19 and 20. When the face grinding operation is completed, the manipulators can be retracted and loaded with side grind wheels. Each tooth has a pair of sides, the grinding wheel manipulators are moved sequentially to the sides of one saw blade to perform a dual side grind of the teeth of that saw blade, before being moved to the sides of the other saw blade to perform a dual side grind of the teeth of that saw blade, as can be seen in FIGS. 21 and 22.

By providing a five axes grind wheel manipulator, the grinding machine 2 can perform a side, top and face grind of the saw teeth of the saw blade, without having to remove the saw blade from the machine for sharpening in another machine. By performing the entire sharpening operation in a single machine, manufacturing costs are expected to drop because multiple machines will not need to be purchased and serviced. Also, operational costs and sharpening times are expected to decrease, thereby increasing efficiency and profitability.

By providing a tool rack in the saw grinding machine 2, and programming the CAM program with a tool changing procedure, the saw grinding machine can automatically change tools between saw grinding operations. By performing sequential grinding operations without the need for manual tool changing, operational costs and sharpening times are expected to decrease, thereby increasing efficiency and profitability.

While the present invention has been described herein by the preferred embodiments, it will be understood to those skilled in the art that various changes may be made and added to the invention. The changes and alternatives are considered within the spirit and scope of the present invention.

What is claimed is:

1. A saw grinding apparatus comprising:
   a saw blade mount for mounting a saw blade thereto; and
   at least one computer numerically controlled (CNC) multiple axes grinding tool manipulator having a spindle connectable to a grinding tool, the manipulator being movable along at least three linear axes and rotatable about at least two rotational axes to position the grinding tool in at least three tool grinding positions against a tooth of the saw blade, wherein the positions enables the grinding tool to perform grinding operations including a top grind, a face grind, and a side grind of the tooth when the saw blade is fixedly mounted to the saw blade mount;
   wherein the manipulator comprises at least three linear modules movable along the at least three linear axes respectively and a two axes rotary joint sub-assembly movably mounted to one of the linear modules.

2. The saw grinding apparatus as claimed in claim 1, wherein the at least three linear modules of the manipulator comprise an X-axis linear module, a Y-axis linear module movably mounted to the X-axis linear module along an X-axis, and a Z-axis linear module movably mounted to the Y-axis linear module along a Y-axis; and the two axes rotary joint sub-assembly is movably mounted to the Z-axis linear module along a Z-axis.

3. The saw grinding apparatus as claimed in claim 2, wherein the two axes rotary joint sub-assembly comprises an A-axis rotary joint, a B-axis rotary joint rotatably mounted to the A-axis rotary joint about an A-axis, and a spindle mount rotatably mounted to the B-axis rotary joint about a B-axis and connected to the spindle.

4. The saw grinding apparatus as claimed in claimed in claim 3, wherein the apparatus comprises a grind plate with a pair of saw blade openings for respectively receiving a saw blade therethrough, and a pair of grinding tool manipulators are mounted to the grind plate such that each grinding tool manipulator can be positioned relative to the saw blades extending through the saw blade openings to perform a top grind and a face grind of one of the saw blades, and wherein the pair of manipulators can be positioned to perform a dual side grind on each of the saw blades.

5. The saw grinding apparatus as claimed in claim 1 further comprising:
   a grind plate with at least one saw blade opening for respectively receiving a saw blade therethrough;
   a controller communicative with the at least one grinding tool manipulator and the saw blade mount; and
   a processor with a computer readable medium storing a computer-aided manufacturing (CAM) program with program code executable by the processor to provide commands to the controller to perform a method comprising:
   moving the saw blade mount into a loading position;
   after a saw blade has been mounted to the saw blade mount, moving the saw blade mount into a sharpening position such that at least part of the saw blade extends through the saw blade opening;
   rotatably advancing a tooth of the saw blade into a tooth grinding position and securing each saw blade in the tooth grinding position;
   mounting a grinding tool to the grinding tool manipulator, and moving the grinding tool manipulator into one of the tool grinding positions wherein the grinding tool can perform a selected grind operation on the tooth of the saw blade; and
   performing the selected grind operation.

6. The saw grinding apparatus as claimed in claim 4 further comprising:
   a controller communicative with the pair of grinding tool manipulators and the saw blade mount; and
   a processor with a computer readable medium storing a computer-aided manufacturing (CAM) program with program code executable by the processor to provide commands to the controller to perform a method comprising:
   moving the saw blade mount into a loading position;
   after a pair of saw blades are mounted to the saw blade mount, moving the saw blade mount into a sharpening position such that at least part of the saw blades extend through the saw blade openings;
   rotatably advancing a tooth of each saw blade into a tooth grinding position and securing each saw blade in the tooth grinding position;
   mounting a grinding tool to each grinding tool manipulator, and moving each grinding tool manipulator into one of the tool grinding positions wherein each grinding tool can perform a selected grind operation on the tooth of each of the saw blades; and
   performing the selected grind operation.

7. The saw grinding apparatus as claimed in claim 5, wherein the selected grind operation is selected from a group consisting of the top grind, the face grind, the side grind, a steel relieving grind, a profiling grind, and a shape plunge grind.

8. The saw grinding apparatus as claimed in claim 7, wherein the selected grind operation is a side grind, and wherein the tool grinding position locates each grinding tool at a respective side of the tooth of one of the saw blades, and wherein performing the grind operation comprises performing a side grind on the one of the saw blades.

9. The saw grinding apparatus as claimed in claim 7, wherein the selected grind operation is a top grind or a face grind, and wherein the tool grinding position locates one of the grinding tools at the tooth of each saw blade such that a top grind or a face grind can be performed simultaneously on both of the saw blades.

10. A saw grinding apparatus comprising:
    a saw blade mount for mounting a saw blade thereto;
    a tool rack comprising multiple tool bays each for storing a grinding tool; and
    at least one computer numerically controlled (CNC) multiple axes grinding tool manipulator having a spindle connectable to a grinding tool, the manipulator being movable along at least three linear axes and rotatable about at least two rotational axes to position the grinding tool in at least three tool grinding positions against a tooth of the saw blade, wherein the positions enables the grinding tool to perform grinding operations including a top grind, a face grind, and a side grind of the tooth when the saw blade is fixedly mounted to the saw blade mount;
    wherein the manipulator comprises at least three linear modules movable along the at least three linear axes respectively and a two axes rotary joint sub-assembly movably mounted to one of the linear modules; and
    wherein the manipulator is movable to one of the tool grinding positions wherein a grind operation can be performed on a saw blade mounted to the saw blade mount, and movable to a tool change position wherein the spindle can engage a grinding tool stored in a tool bay and can deposit a grinding tool in an empty tool bay.

11. The saw grinding apparatus as claimed in claim 10, wherein the apparatus further comprises a housing and the tool rack further comprises a track assembly fixed relative to the housing, and a slider movably relative to track assembly between a loading position wherein the tool bays are outside of the housing and a stored position wherein the tool bays are inside the housing.

12. The saw grinding apparatus as claimed in claim 10, wherein at least some of the tool bays comprise a U-shaped fork, and the grinding tool comprises a tool holder having an annular groove configured to engage the U-shaped fork such that the grinding tool is seated in the tool bay.

13. The saw grinding apparatus as claimed in claim 10 further comprising:
    a grind plate with at least one saw blade opening for respectively receiving a saw blade therethrough;
    a controller communicative with the at least one grinding tool manipulator and the saw blade mount; and
    a processor with a computer readable medium storing a computer-aided manufacturing (CAM) program with program code executable by the processor to provide commands to the controller to perform a method comprising:
    moving the saw blade mount into a loading position;
    after a saw blade has been mounted to the saw blade mount, moving the saw blade mount into a sharpening position such that at least part of the saw blade extends through the saw blade opening;
    rotatably advancing a tooth of the saw blade into a tooth grinding position and securing each saw blade in the grinding position;

moving the grinding tool manipulator into a tool change position and mounting a grinding tool to the grinding tool manipulator suitable to perform a selected grind operation;

moving the grinding tool manipulator into one of the tool grinding positions wherein the grinding tool can perform the selected grind operation on the tooth of the saw blade;

performing the selected grind operation; and moving the grinding tool manipulator into the tool change position and depositing the grinding tool in an empty tool bay.

14. The saw grinding apparatus as claimed in claim 10 further comprising:

a pair of grinding tool manipulators;

a controller communicative with the pair of grinding tool manipulators and the saw blade mount; and a processor with a computer readable medium storing a computer-aided manufacturing (CAM) program with program code executable by the processor to provide commands to the controller to perform a method comprising:

moving the saw blade mount into a loading position;

after a pair of saw blades are mounted to the saw blade mount, moving the saw blade mount into a sharpening position such that at least part of the saw blades extend through the saw blade openings;

rotatably advancing a tooth of each saw blade into a tooth grinding position and securing each saw blade in the tooth grinding position;

moving each grinding tool manipulator into a tool change position and mounting a grinding tool to each grinding tool manipulator that is suitable to perform a selected grind operation, moving each grinding tool manipulator into one of tool grinding positions wherein each grinding tool can perform the selected grind operation on the tooth of each of the saw blades;

performing the selected grinding operations; and moving each grinding tool manipulator into the tool change position and depositing the grinding tools in empty tool bays.

15. The saw grinding apparatus as claimed in claim 13, wherein the selected grind operation is selected from a group consisting of the top grind, the face grind, the side grind, a steel relieving grind, a profiling grind, and a shape plunge grind.

16. The saw grinding apparatus as claimed in claim 6, wherein the selected grind operation is selected from a group consisting of the top grind, the face grind, the side grind, a steel relieving grind, a profiling grind, and a shape plunge grind.

17. The saw grinding apparatus as claimed in claim 16, wherein the selected grind operation is a side grind, and wherein the tool grinding position locates each grinding tool at a respective side of the tooth of one of the saw blades, and wherein performing the grind operation comprises performing a side grind on the one of the saw blades.

18. The saw grinding apparatus as claimed in claim 16, wherein the selected grind operation is a top grind or a face grind, and wherein the tool grinding position locates one of the grinding tools at the tooth of each saw blade such that a top grind or a face grind can be performed simultaneously on both of the saw blades.

19. The saw grinding apparatus as claimed in claim 14, wherein the selected grind operation is selected from a group consisting of the top grind, the face grind, the side grind, a steel relieving grind, a profiling grind, and a shape plunge grind.

* * * * *